(12) United States Patent
Szoke et al.

(10) Patent No.: US 9,263,716 B2
(45) Date of Patent: Feb. 16, 2016

(54) MONOLITHIC BATTERY HOLDER HAVING RESILIENT RETENTION STRAP FOR USE IN BATTERY-POWERED SENSOR

(71) Applicant: Lutron Electronics Co., Inc., Coopersburg, PA (US)

(72) Inventors: Brandon L. Szoke, Walnutport, PA (US); Peter W. Ogden, Breinigsville, PA (US); Keith Joseph Corrigan, Bethelehem, PA (US); Nikhil Vithal Bhate, East Norriton, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 273 days.

(21) Appl. No.: 13/773,134

(22) Filed: Feb. 21, 2013

(65) Prior Publication Data

US 2014/0232348 A1    Aug. 21, 2014

(51) Int. Cl.
| | |
|---|---|
| *H01M 2/10* | (2006.01) |
| *H02J 7/00* | (2006.01) |
| *H01M 10/44* | (2006.01) |
| *H01R 13/24* | (2006.01) |

(52) U.S. Cl.
CPC .......... *H01M 2/1038* (2013.01); *H01M 2/1044* (2013.01); *H02J 7/0042* (2013.01); *H01M 2/1022* (2013.01); *H01M 2/1055* (2013.01); *H01M 10/44* (2013.01); *H01R 13/2442* (2013.01); *Y02E 60/12* (2013.01)

(58) Field of Classification Search
CPC ............ H01M 2/1055; H01M 2/1022; H01M 2/1038; H01M 2/1044; H01M 2/1066; H01M 10/44; Y02E 60/12

USPC ...................... 320/127, 112, 114; 429/96, 100
See application file for complete search history.

(56) References Cited

U.S. PATENT DOCUMENTS

| | | | |
|---|---|---|---|
| 2,985,705 A | 5/1961 | Smythe | |
| 4,487,820 A | 12/1984 | Engelstein et al. | |
| 5,187,026 A * | 2/1993 | Scrivano | .......................... 429/96 |
| 5,316,873 A * | 5/1994 | Scrivano | .......................... 429/96 |
| 5,654,111 A * | 8/1997 | Minomiya et al. | ............ 429/162 |
| 5,714,716 A * | 2/1998 | Yamada | ......................... 174/542 |
| 6,062,901 A * | 5/2000 | Liu et al. | ....................... 439/500 |
| 6,404,079 B1 * | 6/2002 | Hsieh | ............................ 307/117 |

(Continued)

OTHER PUBLICATIONS

"Battery Holder for CR2450," www.memoryprotectiondevices.com/datasheets/BS-2450-datasheet.pdf, accessed Feb. 21, 2013, 1 page.

*Primary Examiner* — Stacy Whitmore
(74) *Attorney, Agent, or Firm* — Condo, Roccia, Koptiw LLP

(57) ABSTRACT

A battery holder for use with a battery-powered sensor may be configured such that removing the battery involves at least two distinct motions. The battery holder may include a cradle and a resilient retention strap configured to be deflectable between relaxed and deflected positions. With the retention strap in the relaxed position, the cradle and the retention strap may cooperate to retain the battery in the inserted position within the battery holder. The battery may be removed by first manipulating the retention strap from the relaxed position to the deflected position, and then using a distinct second motion to remove the battery from the holder. The battery holder may be configured to substantially prevent movement of the battery relative to the cradle when the battery is in the inserted position. The battery holder may be configured to facilitate insertion of the battery into the holder in a desired orientation.

28 Claims, 13 Drawing Sheets

(56) References Cited

U.S. PATENT DOCUMENTS

| | | | |
|---|---|---|---|
| 6,912,429 B1 * | 6/2005 | Bilger | 700/19 |
| 7,123,158 B2 * | 10/2006 | Deluca et al. | 340/693.1 |
| 7,400,594 B2 * | 7/2008 | Pereira et al. | 370/310 |
| 7,473,126 B1 * | 1/2009 | Chen et al. | 439/500 |
| 7,800,498 B2 * | 9/2010 | Leonard et al. | 340/568.2 |
| 7,940,167 B2 | 5/2011 | Steiner et al. | |
| 8,228,184 B2 | 7/2012 | Blakeley et al. | |
| 8,258,654 B2 * | 9/2012 | Parsons | 307/116 |
| D687,328 S * | 8/2013 | Clymer et al. | D10/70 |
| 8,673,481 B2 * | 3/2014 | Chen | 429/163 |
| 8,723,447 B2 * | 5/2014 | Steiner | 315/307 |
| 8,760,293 B2 * | 6/2014 | Steiner | 340/545.3 |
| 2001/0002346 A1 * | 5/2001 | Kodaira | 439/500 |
| 2002/0039676 A1 * | 4/2002 | Ohashi et al. | 429/96 |
| 2003/0077937 A1 * | 4/2003 | Berg et al. | 439/500 |
| 2004/0222914 A1 * | 11/2004 | Imamura | 341/176 |
| 2005/0287423 A1 * | 12/2005 | Yeh | 429/100 |
| 2006/0028997 A1 * | 2/2006 | McFarland | 370/252 |
| 2006/0044152 A1 * | 3/2006 | Wang | 340/825 |
| 2006/0240316 A1 | 10/2006 | Martinez | |
| 2006/0263677 A1 * | 11/2006 | Tsai | 429/97 |
| 2007/0030148 A1 * | 2/2007 | Gabriel et al. | 340/540 |
| 2008/0248376 A1 * | 10/2008 | Rejman et al. | 429/97 |
| 2009/0130907 A1 * | 5/2009 | Chen et al. | 439/627 |
| 2009/0148755 A1 * | 6/2009 | Heinzen et al. | 429/90 |
| 2009/0148757 A1 * | 6/2009 | Zhang et al. | 429/100 |
| 2009/0181574 A1 * | 7/2009 | Wu | 439/500 |
| 2009/0289805 A1 * | 11/2009 | Patrick et al. | 340/636.11 |
| 2010/0022579 A1 * | 1/2010 | Schiemann et al. | 514/291 |
| 2010/0035134 A1 * | 2/2010 | Chen | 429/100 |
| 2010/0047677 A1 * | 2/2010 | Ornt | 429/100 |
| 2010/0059644 A1 * | 3/2010 | Sun | 248/309.1 |
| 2010/0073172 A1 | 3/2010 | Lax | |
| 2010/0315767 A1 * | 12/2010 | Sanchez | 361/679.01 |
| 2011/0139965 A1 | 6/2011 | Sloan et al. | |
| 2012/0009454 A1 * | 1/2012 | Hirano et al. | 429/100 |
| 2012/0295146 A1 * | 11/2012 | Song | 429/100 |
| 2013/0122748 A1 * | 5/2013 | Rapisarda | 439/629 |
| 2014/0030570 A1 * | 1/2014 | Imanishi et al. | 429/100 |
| 2014/0128710 A1 * | 5/2014 | Nakamura et al. | 600/390 |

* cited by examiner

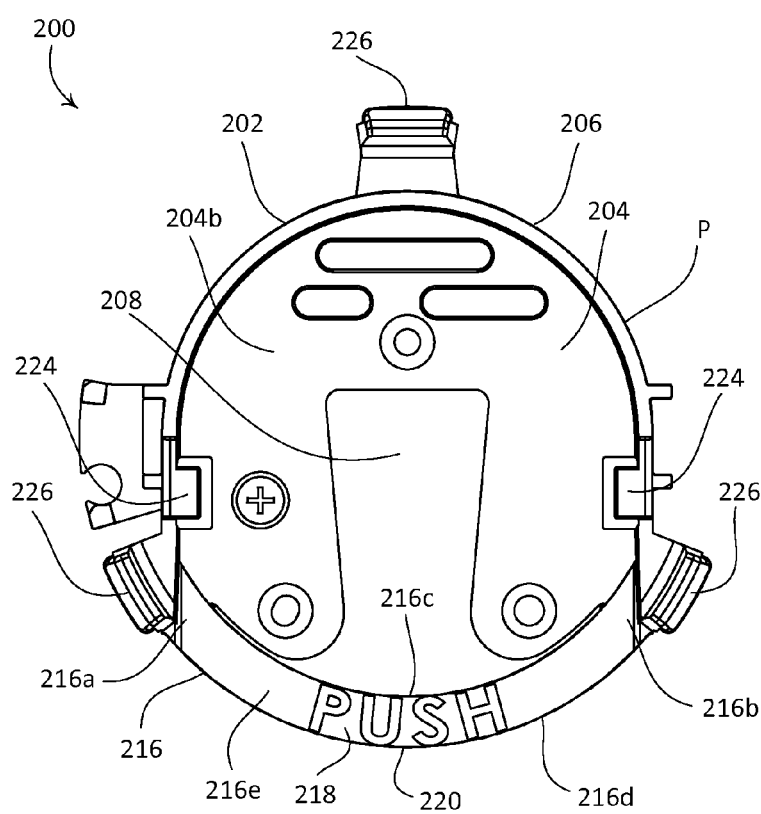
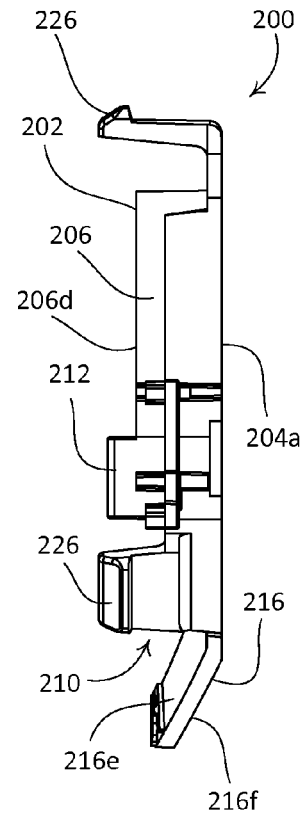
FIG. 4B  FIG. 4C
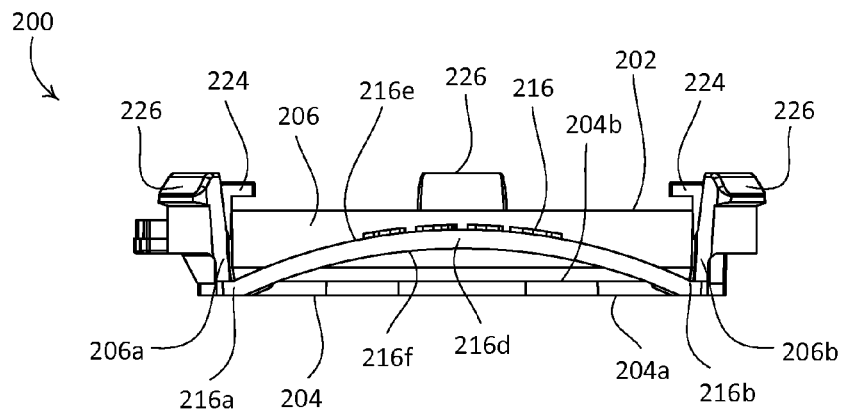
FIG. 4D

MONOLITHIC BATTERY HOLDER HAVING RESILIENT RETENTION STRAP FOR USE IN BATTERY-POWERED SENSOR

BACKGROUND

Load control systems may include one or more sensors configured to communicate with a load control device to effect an operation of the load control device. A sensor may cause the load control device to switch or dim an associated electrical load (e.g., a lighting load). In this regard, the sensor may operate as a control device with respect to a load control device. Examples of such sensors include light sensors, shadow sensors, occupancy/vacancy sensors, temperature sensors, and the like. Such sensors may be configured to be attached to one or more surfaces, such as a wall or ceiling, for example.

FIG. 1 depicts an example load control system 10. As shown, the load control system 10 includes a load control device 20 (e.g., a dimmer switch) and a battery-powered sensor 50 (e.g., a daylight sensor). The sensor 50 includes a housing 52 having a base portion 54 and a cover portion 56 that is releasably attached to the base portion 54. The load control device 20 is configured to be coupled in series electrical connection between an alternating current (AC) power source 30 and an electrical load 40 (e.g., a lighting load) for controlling the amount of power delivered to the electrical load 40. The load control device 20 may be mounted, for example wall-mounted in a standard electrical wall box.

The sensor 50 may be associated with (e.g., assigned to) the load control device 20, for example during a setup procedure of the RF load control system 10. The sensor 50 may be configured to wirelessly communicate digital messages to the load control device 20, for example via radio-frequency (RF) signals 60.

A sensor may be battery powered, and may include a battery holder configured to retain the battery in the sensor. Battery holders of known sensors may be configured such that the battery may be removed from the battery holder via a single motion. FIG. 2 depicts an example prior art battery holder 70 that may be used with a battery-powered sensor (e.g., the sensor 50 depicted in FIG. 1). As shown, the battery holder 70 may include a cradle 72 configured to at least partially retain a battery 120 within the battery holder 70. The cradle 72 may include a wall 74 that extends around a portion of a perimeter of the cradle 70. The wall 74 may define an opening 76 through which the battery 120 can be inserted into, or removed from, the cradle 70.

The battery 120 may be removed from the battery holder 70 using a single motion. For example, the battery 120 may be slid out of the cradle 70 by applying a force F to the battery 120 along a direction radially outward from the center of the cradle 70, toward the opening 76. The force F may be applied to the battery 120 using a finger, for example, which may cause the battery 120 to slide out of the battery holder 70 through the opening 76. An example of a sensor having a battery holder similar to the battery holder 70 depicted in FIG. 2 is described in greater detail in U.S. Patent Application Publication No. 2011/0139965, published Jun. 16, 2011, entitled DAYLIGHT SENSOR HAVING A ROTATABLE ENCLOSURE, the entire disclosure of which is incorporated herein by reference.

Ease of battery removal from the battery holder of a sensor may be desirable, for example from an end user perspective, but makes the sensor vulnerable to having the battery become separated from the battery holder undesirably. For example, if the battery holder is dropped, an impact force imparted to the battery holder may cause the battery to be ejected from the battery holder.

SUMMARY

As disclosed herein, a battery-powered sensor may include a battery holder configured to retain a battery. The battery holder may be configured such that removing the battery involves at least two motions.

The battery holder may include a cradle and a resilient retention strap configured to be manipulated from a relaxed position to a deflected position (e.g., during insertion or removal of the battery). The retention strap may be manipulated to the deflected position such that a battery may be inserted over a portion of the retention strap and into the cradle. As the battery advances into an inserted position in the cradle, the battery may pass beyond the retention strap such that the retention strap returns to its relaxed position. With the retention strap in the relaxed position, the cradle and the retention strap may cooperate to retain the battery in the inserted position within the battery holder.

The battery holder may be configured such that the battery may be removed from the battery holder using at least two distinct motions. The battery may be removed by first manipulating the retention strap from the relaxed position to the deflected position. With the retention strap in the deflected position, a distinct second motion may be applied to remove the battery from the battery holder. For example, a force may be applied to the battery to cause the battery to slide up and over a portion of the deflected retention strap and out of the cradle. When the battery is removed from the battery holder, the retention strap returns to its relaxed position.

The retention strap may be configured to substantially prevent movement of the battery relative to the cradle when the battery is in the inserted position. For example, the retention strap may include a projection configured to abut the battery when the battery is in the inserted position. The cradle and the projection may cooperate to restrain movement of the battery in the battery holder.

The battery holder may be configured to facilitate insertion of the battery into the holder in a desired orientation. For example, the battery holder may include one or more alignment members supported by the cradle. The alignment members may correspond to a structural profile of the battery, such that the alignment members facilitate insertion of the battery into the battery holder when the battery is in a desired orientation.

BRIEF DESCRIPTION OF THE DRAWINGS

FIG. 4B is a top elevation view of the battery holder depicted in FIG. 4A.

FIG. 4C is a right side elevation view of the battery holder depicted in FIG. 4A.

FIG. 4D is a front elevation view of the battery holder depicted in FIG. 4A.

DETAILED DESCRIPTION

Figure 1:
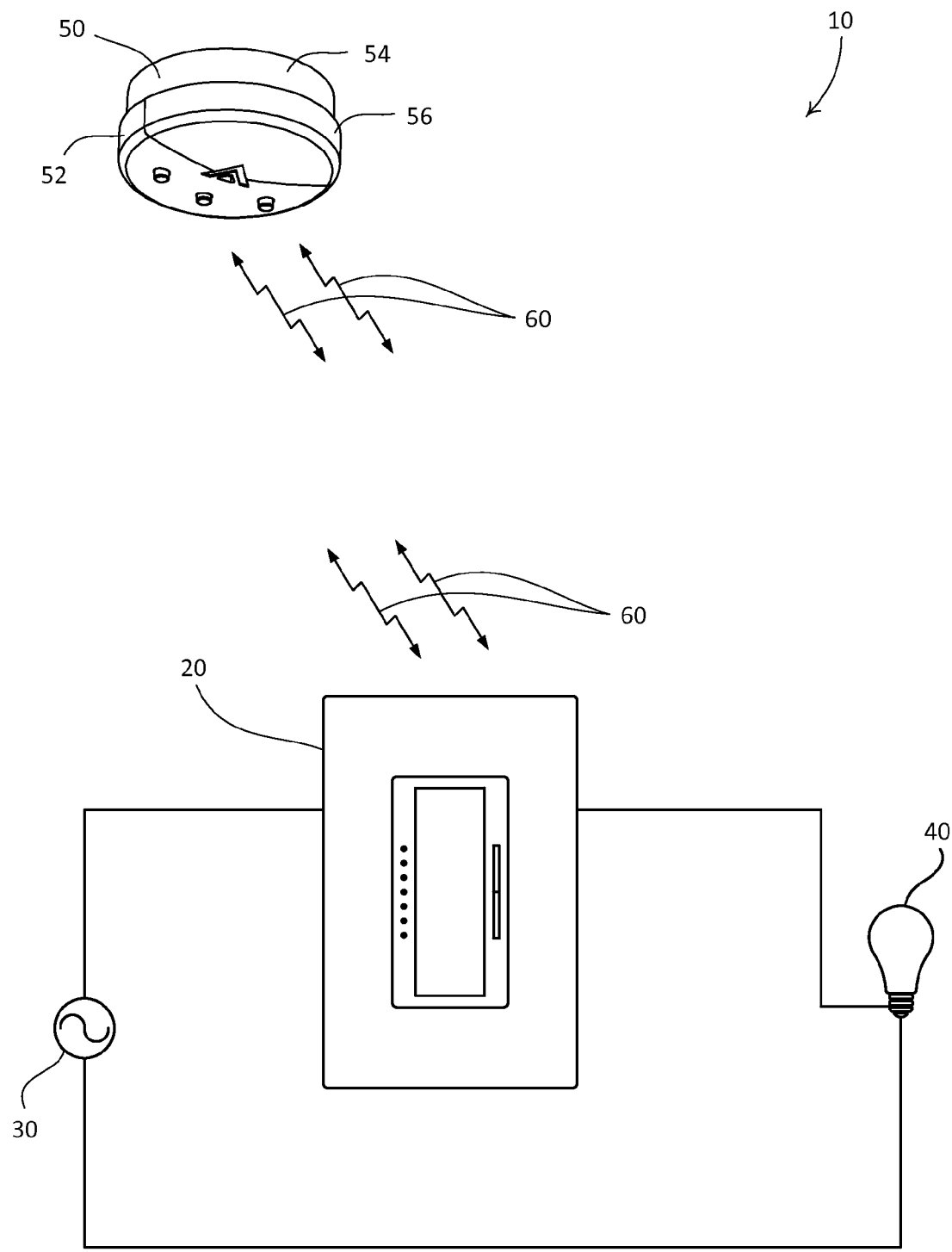
FIG. 1 is a perspective view of an example battery-powered sensor.
Figure 2:
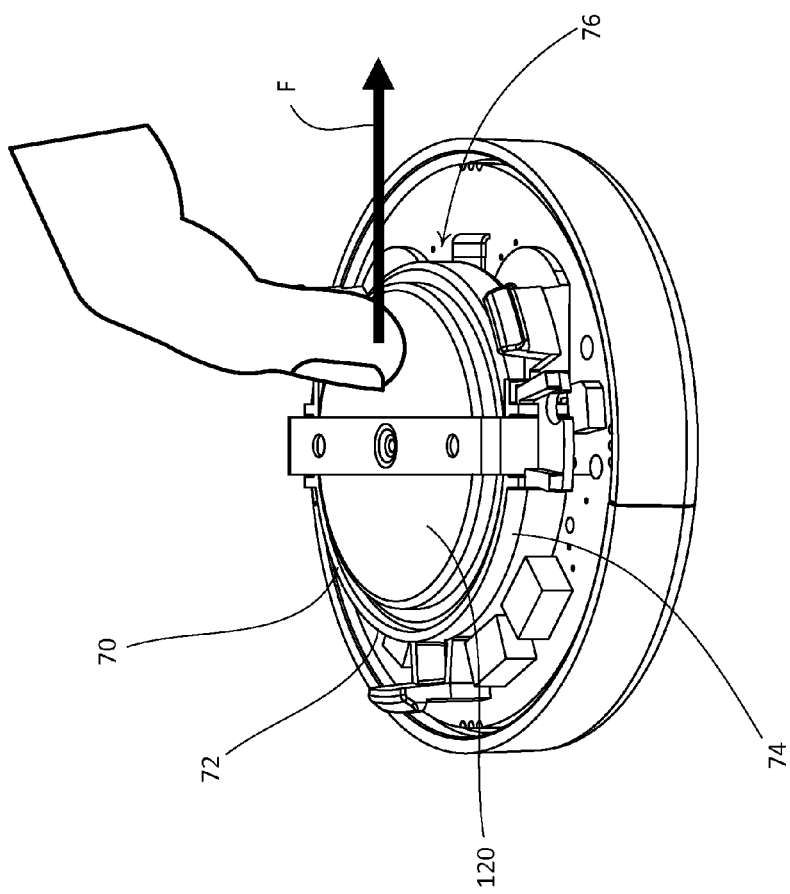
FIG. 2 depicts an example prior art battery holder that may be included in a battery-powered sensor.
Figure 3:
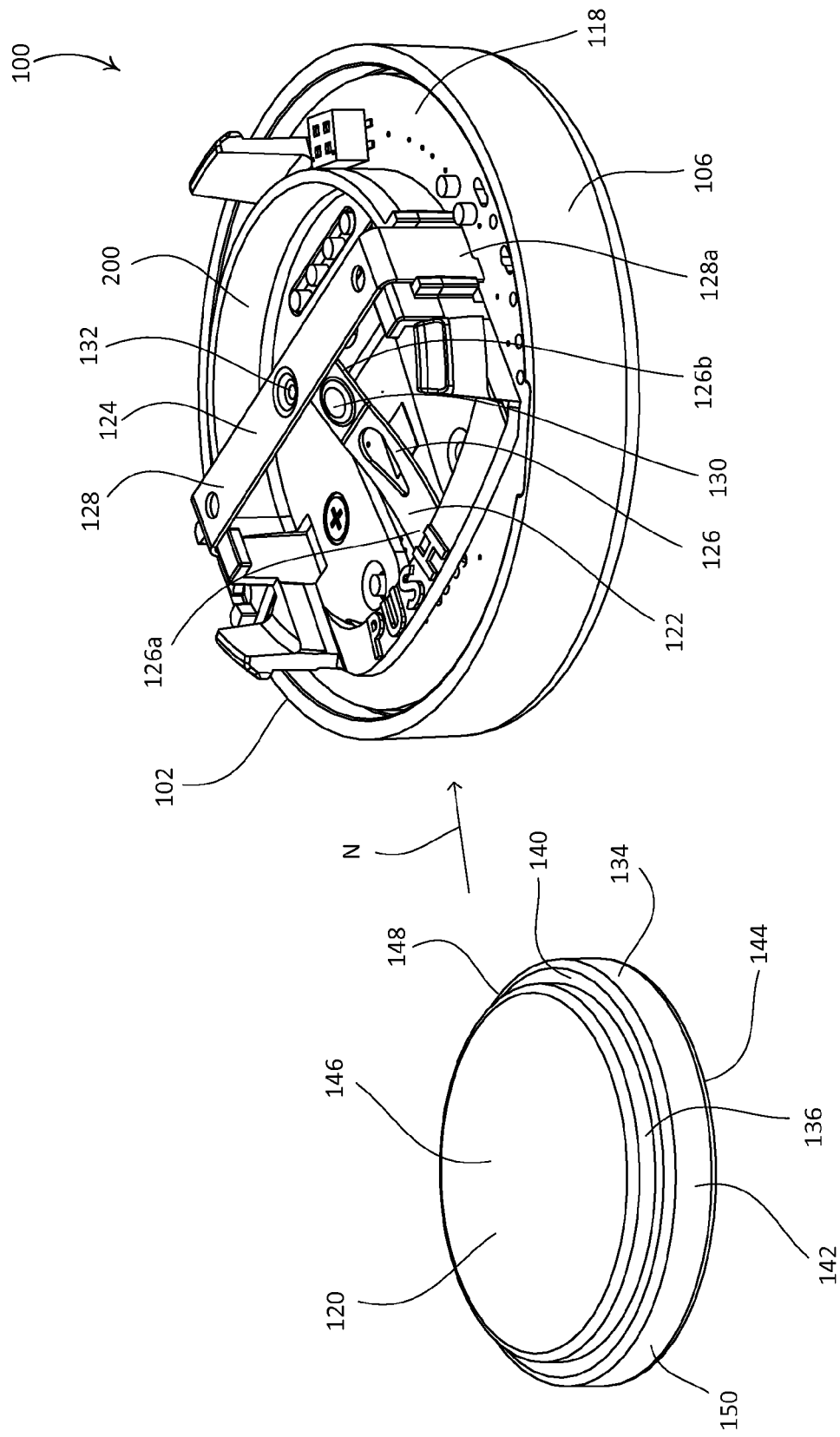
FIG. 3 is a perspective view of an example sensor with the cover portion of the housing detached from the base portion, exposing an example battery holder.
Figure 4A:
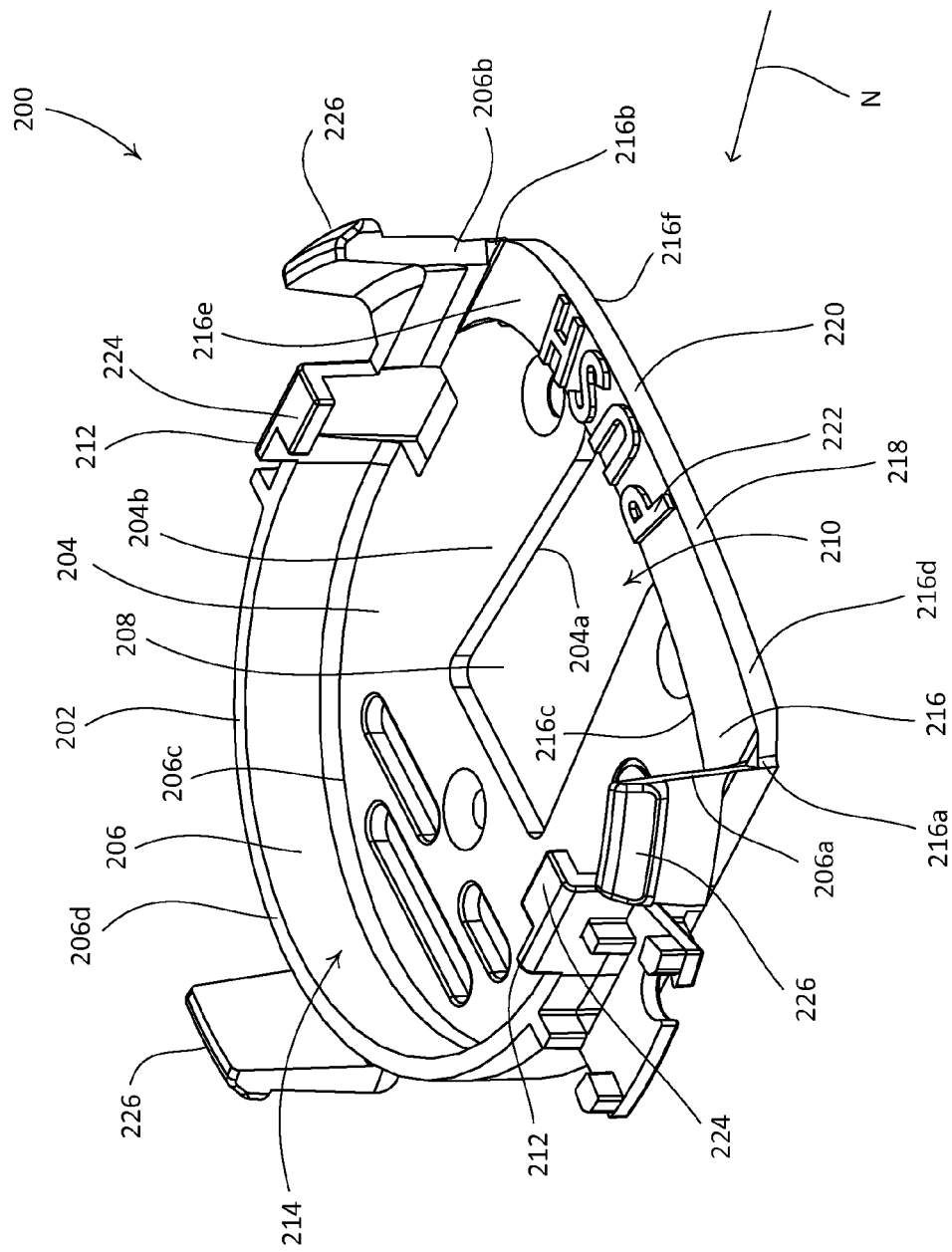
FIG. 4A is a perspective view of an example battery holder.

FIG. 3 depicts an example sensor 100 that may be deployed, for example, in a load control system as depicted in FIG. 1. The sensor 100 may be configured to cause a load control device to switch or dim an associated electrical load (e.g., a lighting load), for example. In this regard, the sensor 100 may operate as a control device with respect to a load control device, for example a load control device with which the sensor 100 is associated. It should be appreciated that the sensor 100 is not limited to operating as a control device with respect to a load control device, and that the sensor 100 may be configured to control any other suitable electronic device.

The sensor 100 may include a housing 102 having a base portion (not shown) and a cover portion 106 that is configured to be releasably attached to the base portion. The housing 102, including the base portion and the cover portion 106, may define any other suitable shape, for example a substantially cylindrical shape as shown. The housing 102 may be made of any suitable material, for example plastic. The sensor 100 may include a printed circuit board (PCB) 118 that may be enclosed within the housing 102, for example within the cover portion 106. The sensor 100 may include a battery holder 200 configured to retain a battery configured to power the sensor 100, for example the battery 120. The battery holder 200 may be configured to be attached to a component of the sensor 100 enclosed within the housing 102. As shown, the battery holder 200 is attached to the PCB 118.

The PCB 118 may have a substantially cylindrical substrate body, as shown, and may define one or more surfaces configured to support electrical components of the sensor, for example a sensor element (e.g., a photosensitive diode), a processor, a transceiver configured to wireless communication, and the like. The PCB 118 may be configured to facilitate attachment of the battery holder 200 to the PCB 118.

The sensor 100 may include one or more electrical contacts configured to place the battery 120 in electrical communication with the electrical components mounted to the PCB 118. For example, the illustrated sensor 100 includes a first electrical contact 122 configured to be placed in electrical communication with a positive terminal of the battery 120 and a second electrical contact 124 configured to be placed in electrical communication with a negative terminal of the battery 120. The first and second electrical contacts 122, 124 may be spaced apart from each other, such that when the battery 120 is inserted there between, the first and second electrical contacts 122, 124 abut the positive and negative terminals of the battery 120, respectively.

The first electrical contact 122 may define a resilient contact beam 126 having a fixed end 126a supported by, and electrically coupled to, the PCB 118 and an opposed free end 126b spaced from the PCB 118. The contact beam 126 may define at least one projection 130 configured to abut, and place the contact beam 126 in electrical communication with, the positive terminal of the battery 120, for example when the battery 120 is inserted between the first and second electrical contacts 122, 124. The projection 130 may be located proximate the free end 126b and may extend from an upward facing surface of the contact beam 126, away from the PCB 118.

The second electrical contact 124 may define a substantially rigid contact strap 128 having opposed ends 128a configured to be supported by, and electrically coupled to, the PCB 118. The contact strap 128 may be configured to be spaced from the PCB 118 and to span at least a portion of the battery holder 200, for example between opposed sides of the battery holder 200. The contact strap 128 may define at least one projection 132 configured to abut, and place the contact strap 128 in electrical communication with, the negative terminal of the battery 120, for example when the battery 120 is inserted between the first and second electrical contacts 122, 124. The projection 132 may be located proximate a midpoint of the contact strap 128, and may extend from a downward facing surface of the contact strap 128, toward the PCB 118.

The battery 120 may be, for example, a cylindrical shaped battery (e.g., a button cell or coin cell battery). The battery 120 may have a cylindrical shaped lower body portion 134 and a cylindrical shaped, insulated upper body portion 136 attached to the lower body portion 134. The lower body portion 134 may define a first diameter and the upper body portion 136 may define a second diameter that is smaller than the first diameter, such that upper and lower body portions 136, 134 define a lip 140 that extends around substantially an entirety of an outer perimeter of the battery 120. The lower body portion 134 of the battery may define a continuous, peripheral surface 142 of the battery 120 that extends around the entirety of a perimeter of the lower body portion 134.

The lower body portion 134 may be configured as the positive terminal of the battery 120 and may define a lower surface 144 configured to abut at least a portion of the first electrical contact 122, for example the projection 130. The upper body portion 136 may be configured as the negative terminal of the battery 120 and may define an upper surface 146 configured to abut at least a portion of the second electrical contact 124, for example the projection 132. When the battery 120 is being inserted into the battery holder 200, for example along an insertion direction N, the battery 120 may define a first end 148 and an opposed second end 150.

FIGS. 4A-4D depict an example battery holder 200, which may be used in a battery-powered sensor, such as the sensor 100 depicted in FIG. 3. The battery holder 200 may be made of any suitable material, for example plastic. The battery holder 200 may include one or more retention members configured to retain a battery (e.g., the battery 120) in the battery holder 200. As shown, the battery holder 200 includes a cradle 202 and a resilient retention strap 216. The cradle 202 and the retention strap 216 may cooperate to retain the battery 120 in the battery holder 200. The cradle 202 may operate as a first retention member and the retention strap 216 may operate as a second retention member.

The cradle 202 may be configured to receive at least a portion of the battery 120. As shown, the cradle 202 includes a base plate 204 and a wall 206 supported by the base plate 204. The base plate 204 may be configured to be attached to the PCB 118, for example to an upward facing surface of the PCB 118. The base plate 204 defines a lower surface 204a configured to at least partially abut the PCB 118 when the battery holder 200 is attached to the PCB 118, and an opposed upper surface 204b that is configured to abut with at least a portion of the lower surface 144 of the battery 120 when the battery 120 is inserted in the cradle 202. The base plate 204 defines an outer perimeter P that may be substantially circular, for example. The base plate 204 defines a slot 208 that extends there through along a direction that is substantially normal to the base plate 204. The slot 208 may be sized to receive at least a portion of the contact beam 126 of the first electrical contact 122, for example when the battery 120 is inserted in the battery holder 200.

The wall 206 may extend (e.g., continuously) along a portion of the perimeter P of the base plate 204, from a first end 206a to a second end 206b, and may extend upward from the upper surface 204b of the base plate 204, for example along a direction that is substantially normal to the base plate 204. The cradle 202 defines an opening 210 through which the battery 120 may be inserted into, or removed from, the battery holder 200, for example along the insertion direction N. The opening 210 may be at least partially bounded, for example, by the first and second ends 206a, 206b, of the wall 206 and the upper surface 204b of the base plate 204. The first and second ends 206a may be spaced apart from each other by a distance that is larger (e.g., slightly larger) than a diameter of the lower body portion 134 of the battery 120, for example.

The wall 206 defines a lower end 206c that may be substantially coincident with the upper surface 204b of the base plate 204 and an opposed upper end 206d that is spaced from the lower end 206c. The wall 206 may have a height (e.g., as defined by the upper and lower ends 206c, 206d, respectively) that may be shorter than a height of the battery 120 (e.g., as defined by the upper and lower surfaces 146, 144). The wall 206 may be configured to at least partially support the contact strap 128 of the second electrical contact 124. For example, the illustrated wall 206 includes a pair of posts 212 that extend upward from the upper end 206d of the wall 206, on opposed sides of the cradle 202. The cradle 202 defines a void 214, for example as defined by the wall 206 and the base plate 204. The void 214 may define a volume sized to receive at least a portion of the battery 120.

The retention strap 216 may be configured as a resilient, deflectable retention strap 216. The retention strap 216 may be configured to facilitate retention of the battery 120 in an inserted position in the battery holder 200. The retention strap 216 defines a first end 216a and an opposed second end 216b. The retention strap 216 may be elongate between the first and second ends 216a, 216b, respectively. The retention strap 216 may define an inner surface 216c that may face inward relative to the opening 210 and an opposed outer surface 216d that may face outward relative to the opening 210. The retention strap 216 may define an upward facing upper surface 216e and an opposed downward facing lower surface 216f.

The retention strap 216 may be supported by the cradle 202. The retention strap 216 may be integral (e.g., monolithic) with the cradle 202 or may be separate from and attached to the cradle 202 or to another component of the battery holder 200. The first and second ends 216a, 216b of the illustrated retention strap 216 are integral with the base plate 204 at locations proximate to the first and second ends 206a, 206b of the wall 206, such that the retention strap 216 and the cradle 202 are monolithic.

The retention strap 216 may define a curved portion 218 between the first and second ends 216a, 216b. The curved portion 218 may define an apex 220, for example at a location substantially equidistant between the first and second ends 216a, 216b. The curved portion 218 may define a compound curvature. As shown, the curved portion 218 of the retention strap 216 defines a first curvature and a second curvature. The first curvature is defined such that at least one of the inner and outer surfaces 216c, 216d is spaced outwardly, relative to the center of the cradle 202, from the first and second ends 216a, 216b. The inner and outer surfaces 216c, 216d may be spaced furthest from the center of the cradle 202 proximate to the apex 220. The second curvature is defined such that the upper and lower surfaces 216e, 216f of the retention strap 216 are spaced further from the base plate 204 proximate to the apex 220 than at the first and second ends 216a, 216b. The upper and lower surfaces 216e, 216f may be spaced furthest from the base plate 204 proximate to the apex 220.

The retention strap 216 may be configured to be resiliently deflectable between a relaxed position and a deflected position. The retention strap 216 is illustrated in a relaxed position in FIGS. 4A-4D. The retention strap 216 may be manipulated from the relaxed position to the deflected position by the application of a force to retention strap 216, for example by a force applied to the upper surface 216e of the retention strap 216.

The upper surface 216e of the retention strap 216 may define an indicator 222 including one or more symbols (e.g., letters) pertaining to operation of the retention strap 216. For example, the illustrated retention strap 216 includes an indicator 222 comprising raised letters forming the word "PUSH." It should be appreciated that the retention strap 216 is not limited to the illustrated indicator, and that the retention strap 216 may include any other suitable indicator (e.g., one or more words in a different language, a symbol, or the like) or may not define an indicator, for example such that the upper surface 216e of the retention strap 216 is substantially smooth.

The battery holder 200 may be configured to facilitate insertion of the battery 120 into the battery holder 200 when the battery 120 is in a proper orientation relative to the battery holder 200. For example, the battery holder 200 may include one or more alignment members configured to facilitate insertion of the battery 120 into the cradle 202 when the battery 120 is in a proper orientation. The battery 120 may be in a proper orientation relative to the cradle 202 when the lower surface 144 of the battery 120 (e.g., the positive terminal) faces inward toward the base plate 204 and the upper surface 146 of the battery 120 (e.g., the negative terminal) faces outward away from the base plate 204.

The illustrated cradle 202 includes a pair of alignment tabs 224 configured to facilitate insertion of the battery 120 into the battery holder (e.g., into the cradle 202) when the battery 120 is in a proper orientation. The alignment tabs 224 are supported by the posts 212, at respective upper ends of the posts 212. The alignment tabs 224 extend inward into the void 214. The alignment tabs 224 may be configured to correspond to a structural profile of the battery 120. For example, the illustrated alignment tabs 224 are shaped to be received in the lip 140 of the battery 120 when the battery 120 is inserted through the opening 210 and into the cradle 202 when the battery 120 is in the proper orientation.

The alignment tabs 224 may be configured to interfere with the lower body portion 134 of the battery 120 if an attempt is made to insert the battery 120 into the opening 210 in an improper orientation, for example if the battery is in an upside down orientation such that the lower surface 144 faces outward away from the base plate 204 of the cradle 202 and the upper surface 146 faces inward toward the base plate 204. If the battery 120 is inserted into the cradle 202 in an improper orientation (e.g., upside down) the sensor 100 may fail to function properly, for example the sensor 100 may not function at all. It should be appreciated that the battery holder 200 is not limited to the illustrated alignment members and that the battery holder 200 may include one or more alternatively constructed alignment members configured to facilitate insertion of the battery 120 into the battery holder 200 when the battery 120 is in the proper orientation.

The battery holder 200 may be configured to facilitate releasable attachment of the cover portion 106 of the housing 102 to the base portion. For example, the battery holder 200 may include one or more attachment members configured to allow the cover portion 106 of the sensor 100 to be attached to the base portion. The illustrated cradle 202 includes a plurality of resilient latch members 226 configured to be received in corresponding apertures supported by the base portion (not shown).

Figure 5A:
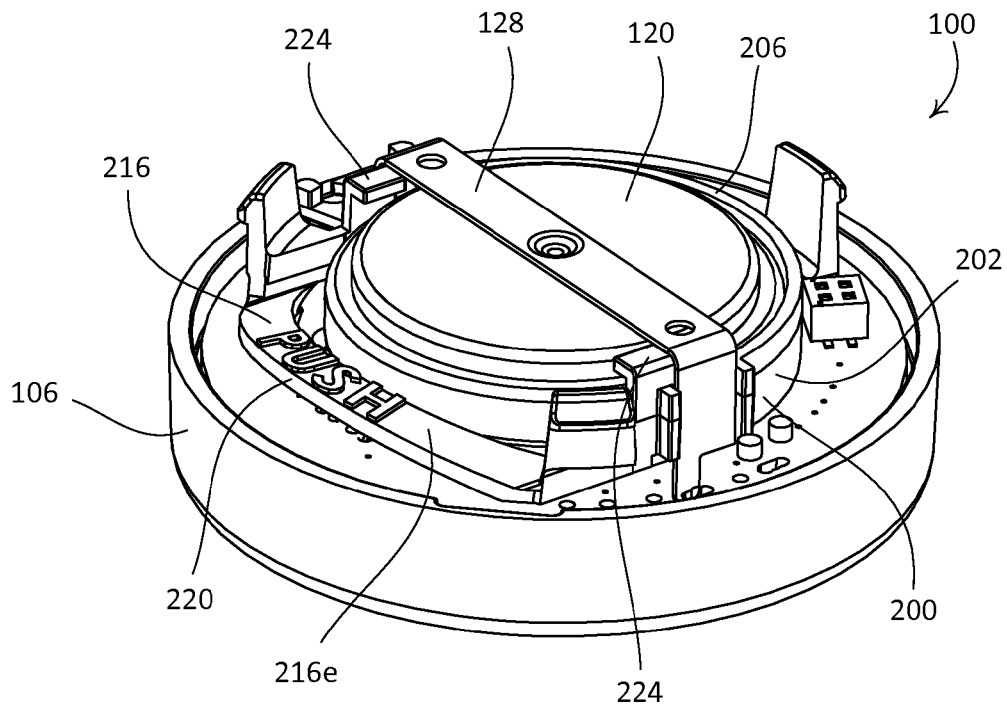
FIGS. 5A-5H illustrate an example process for removing a battery from a battery holder having a resilient, deflectable retention strap.

FIGS. 5A-5H illustrate an example procedure for removing a battery 120 from the example battery holder 200 depicted in FIG. 3. FIG. 5A illustrates the battery holder 200 with the battery 120 in an inserted position in the battery holder 200. With the battery 120 in an inserted position in the battery holder 200, the retention strap 216 may be in the relaxed position and the first and second electrical contacts 122, 124 may abut the lower and upper surfaces 144, 146 of the battery, respectively. The cradle 202 and the retention strap 216 may at least partially surround the battery 120 when the battery 120 is in an inserted position in the battery holder 200.

Figure 5B:
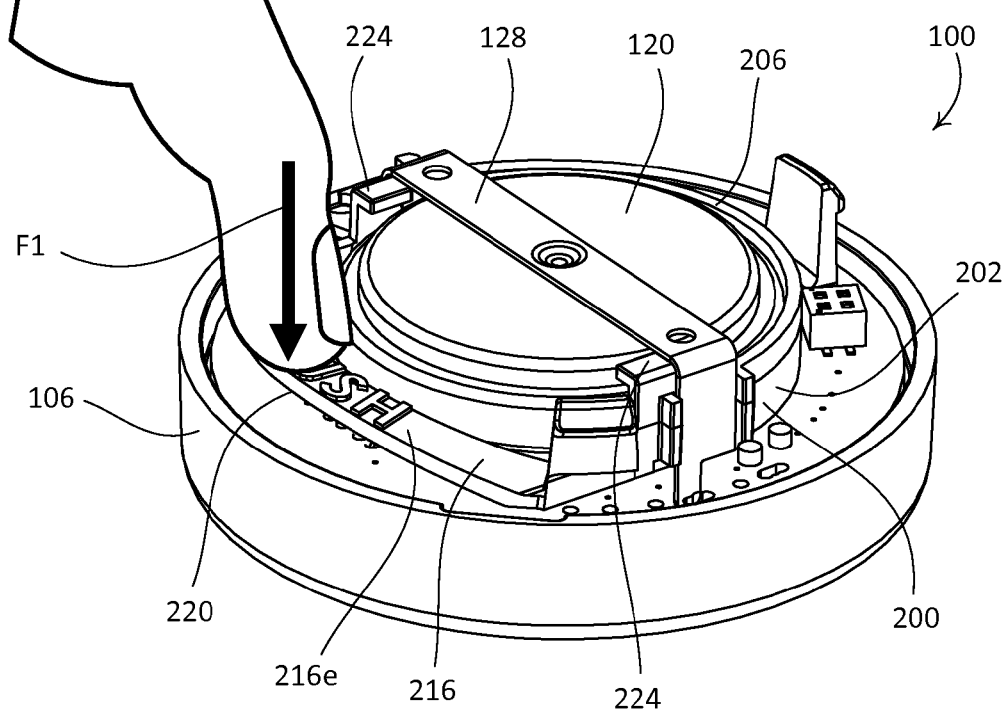

The battery 120 may be removed from the battery holder 200 using two distinct motions. A first motion may include manipulating the retention strap 216 from the relaxed position to the deflected position. A first force F1 may be applied to the upper surface 216e of the retention strap 216, for example along a direction substantially normal to the base plate 204 of the cradle 202, causing the curved portion 218 of the retention strap 216 to deflect toward the base plate 204. The first force F1 may be applied by a finger, for example, as illustrated in FIG. 5B.

Figure 5C:
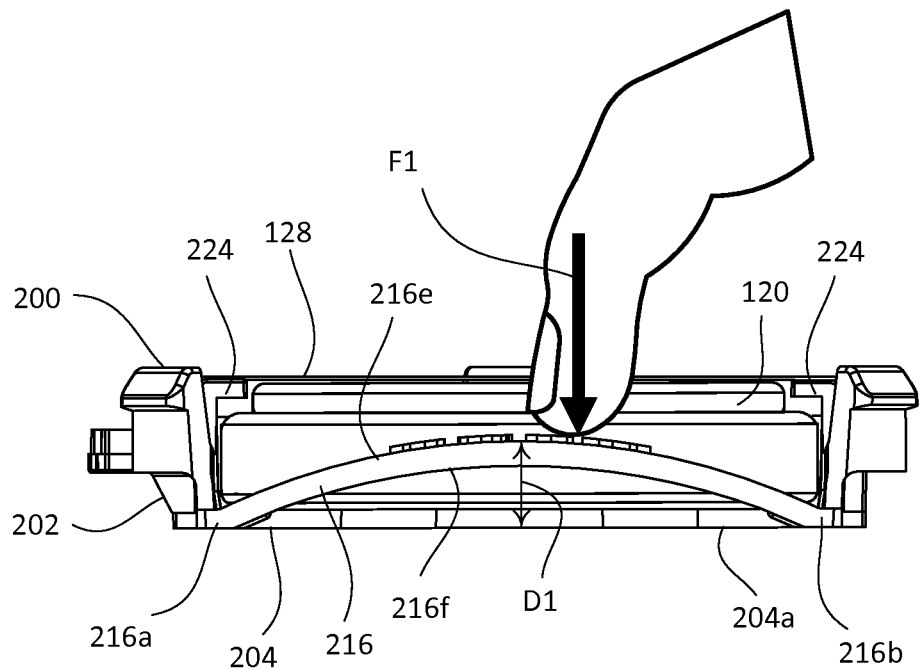
Figure 5D:
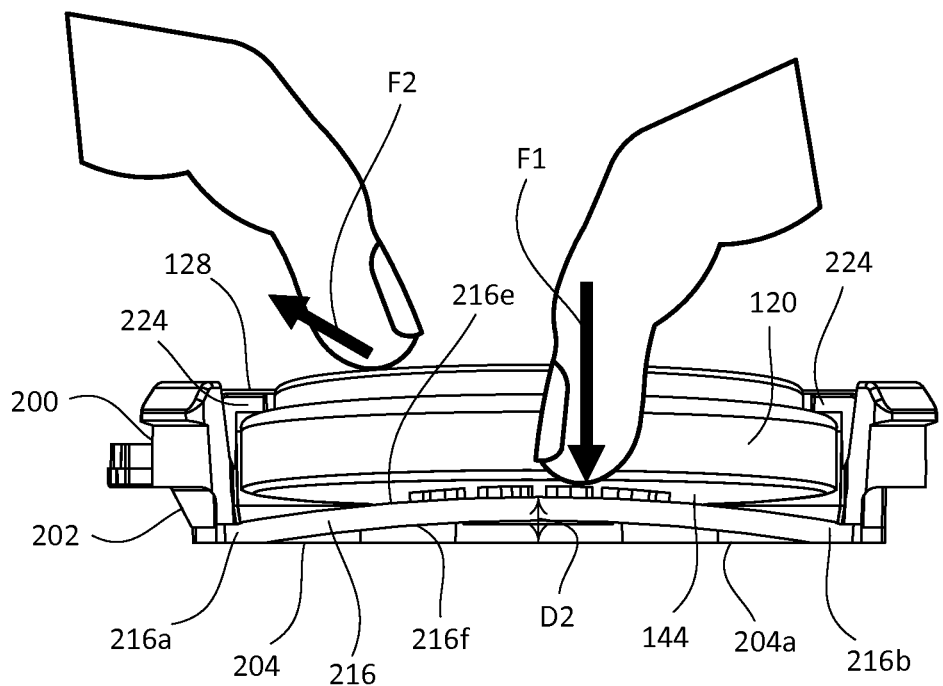

Referring now to FIGS. 5C and 5D, when the retention strap 216 is in the relaxed position, the upper surface 216e of the retention strap 216, proximate the apex 220, may be spaced from the lower surface 204a of the base plate 204 by a first distance D1. When the retention strap 216 is in the deflected position, for example as a result of application of the first force F1, the upper surface 216e of the retention strap 216, proximate the apex 220, may be spaced from the lower surface 204a of the base plate 204 by a second distance D2 that is shorter than the first distance D1. As the first force F1 is applied to the retention strap 216, the retention strap 216 may deflect from the relaxed position (e.g., as illustrated in FIG. 5C) to the deflected position (e.g., as illustrated in FIG. 5D).

Figure 5E:
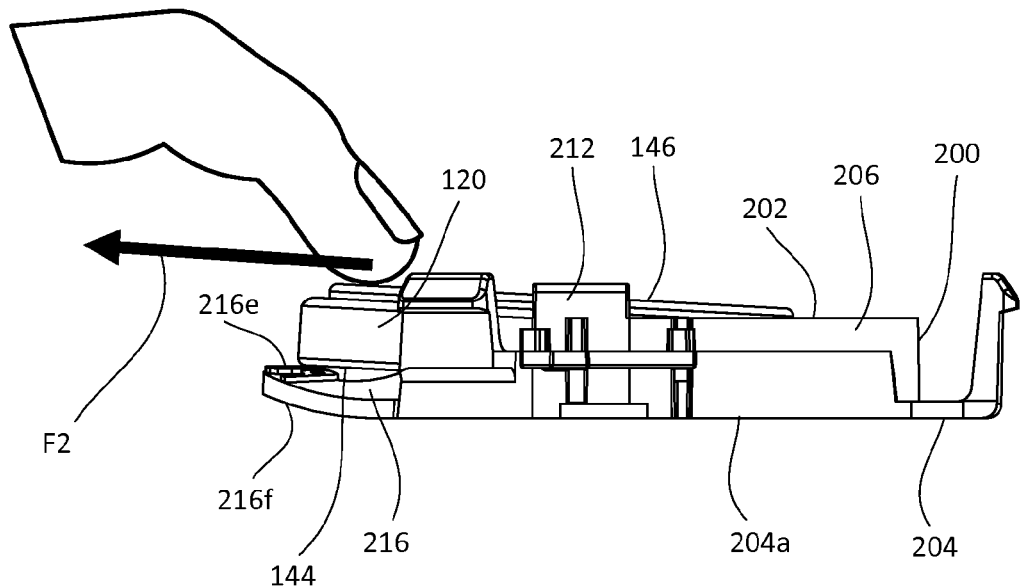
Figure 5F:
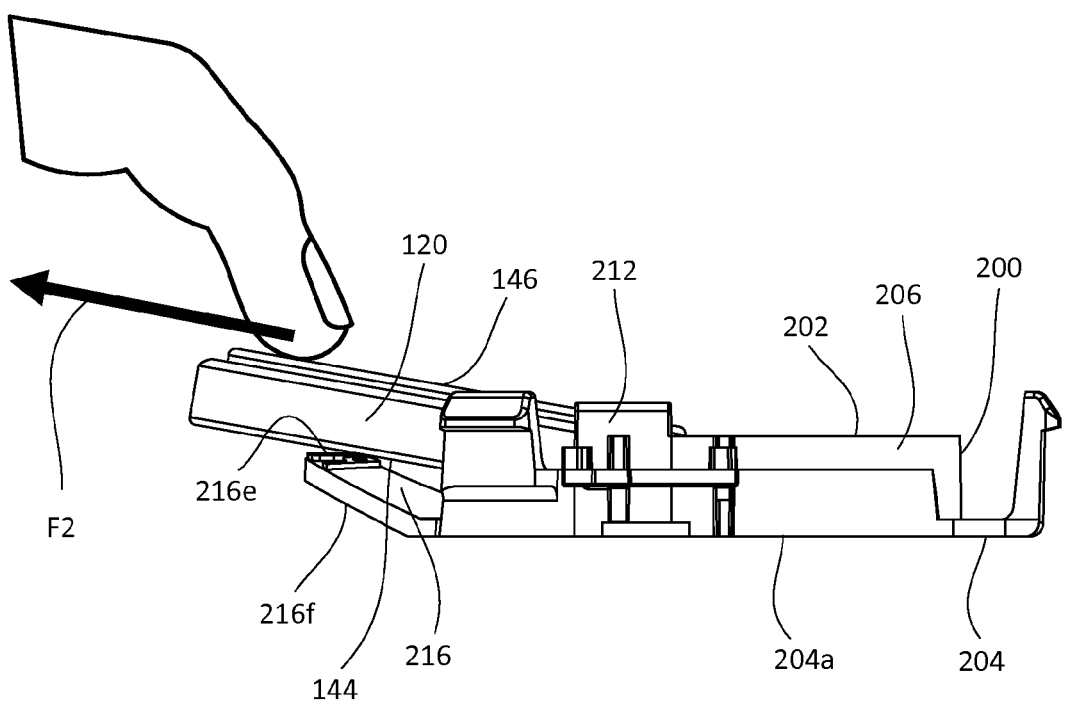

Referring now to FIGS. 5D-5F, with the retention strap 216 in the deflected position, a second motion may be applied to the battery 120 to initiate removal of the battery 120 from the battery holder 200. For example, a second force F2 may be applied to the battery 120 (e.g., applied to the upper surface 146 of the battery 120) along a direction toward the opening 210, such that the lower surface 144 of the battery 120 rides onto the upper surface 216e of the retention strap 216 (e.g., as illustrated in FIGS. 5D and 5E). The second F2 may be applied along a direction that is, for example, substantially normal to that along which the first force F1 is applied. The first force F1 exerted as part of the first motion may be maintained while initiating the second motion, for example such that the retention strap 216 remains in the deflected position as the second motion is initiated. Application of the first force F1 may be terminated when at least a portion of the lower surface 144 of the battery 120 has traversed onto the upper surface 216e of the retention strap 216.

Figure 5G:
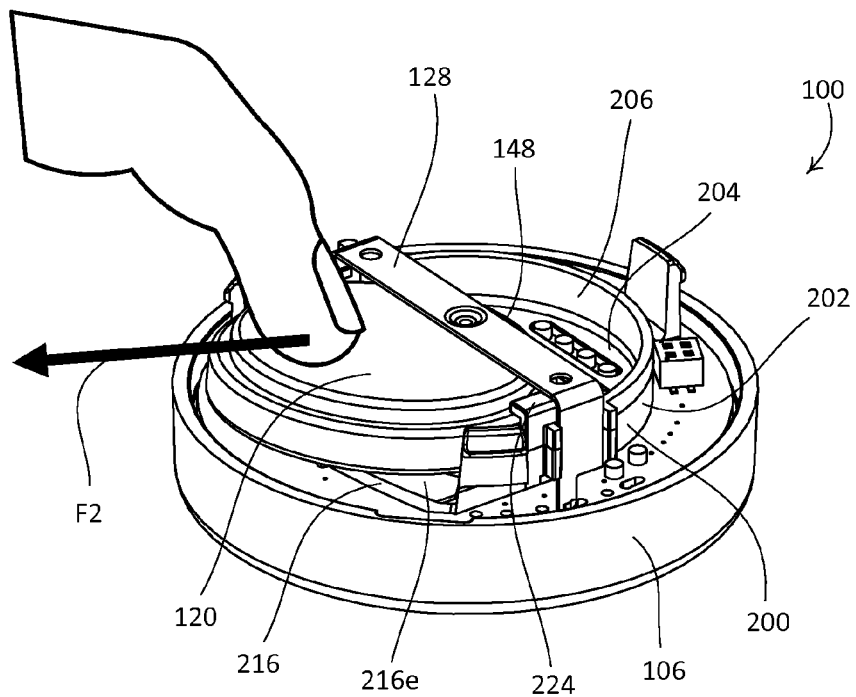
Figure 5H:
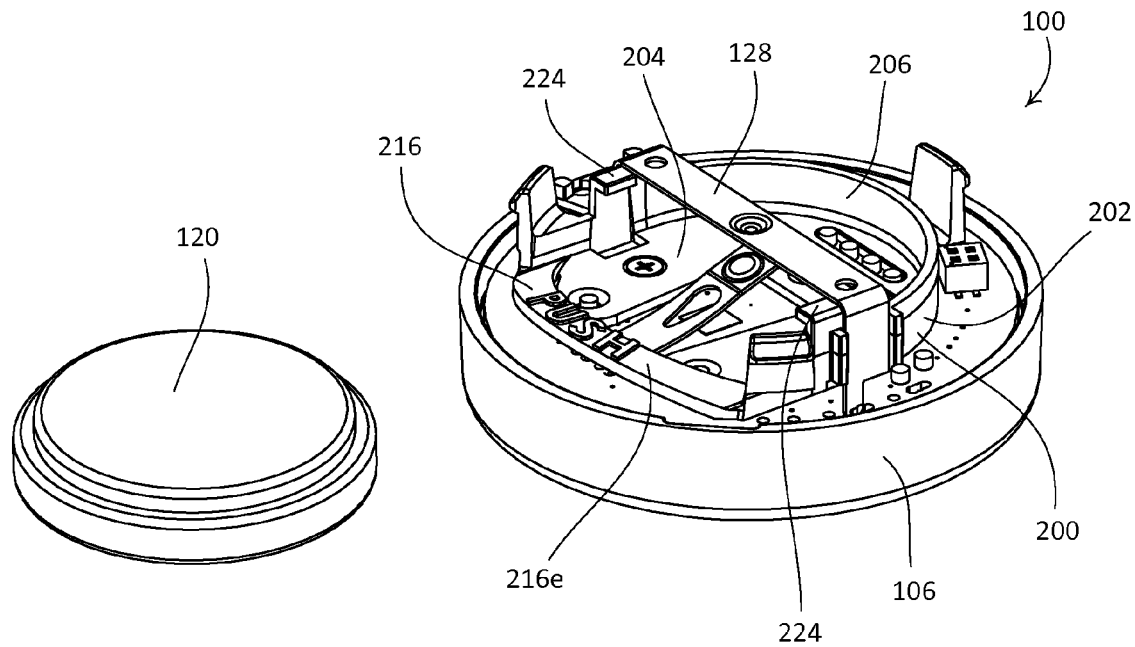

As the battery 120 advances into the opening 210 and rides along the retention strap 216, the retention strap 216 may resiliently deflect upward toward the relaxed position (e.g., as illustrated in FIGS. 5F and 5G). The second force F2 may be applied until the battery 120 advances through the opening 210 a sufficient distance such that battery 120 may be removed from the battery holder 200. The battery 120 may be advanced through the opening 210 a sufficient distance such that the first end 148 of the battery 120 advances past the contact strap 128, such that the battery 120 may be removed from the battery holder 200 (e.g., as illustrated in FIG. 5H).

An example procedure for inserting the battery 120 into the battery holder 200 may include manipulating the battery 120 into the proper insertion orientation, such that the lower surface 144 of the battery 120 faces downward toward the base plate 204 and the upper surface 146 faces upward away from the base plate 204. The first end 148 of the battery may be inserted into the opening 210, such that at least a portion of the upper surface 146 of the battery is received below the contact strap 128 and at least a portion of the lower surface 144 (e.g., proximate the first end 148) abuts the contact beam 126, which may cause the contact beam 126 to deflect into the slot 208.

The battery 120 may be manipulated such that at least a portion of the lower surface 144 of the battery 120 makes contact with the upper surface 216e of the retention strap 216. As the battery 120 advances through the opening 210 and into the cradle 202, such that the upper surface 146 of the battery 120 is received under, and abuts against, the contact strap 128, the lower surface 144 of the battery 120 may apply a downward force against the upper surface 216e of the retention strap 216, which may that causes the retention strap 216 to deflect from the relaxed position toward the deflected position.

As the battery 120 advances further into the cradle 202, such that second end 150 of the battery 120 passes beyond the inner surface 216c of the retention strap 216, at least a portion of the lower surface 144 of the battery 120 may abut the upper surface 204b of the base plate 204. Once the second end 150 of the battery 120 advances beyond the inner surface 216c of the retention strap 216, the retention strap 216 may relax from the deflected position to the relaxed position, such that the upper and lower surfaces 216e, 216f of the retention strap 216 are located between the upper surface and lower surfaces 146, 144 of the battery 120, such that at least a portion of the inner surface 216c of the retention strap 216 is aligned with a portion of the peripheral surface 142 of the battery 120.

With the battery 120 in the inserted position in the battery holder 200, the cradle 202 (e.g., at least a portion of the wall 206) and the retention strap 216 may cooperate to retain the battery 120 in the inserted position. The wall 206 of the cradle may abut at least a portion of the peripheral surface 142 of the battery 120 if the battery 120 is moved along a direction that is radially outward from the center of the cradle 202, for example toward the wall 206. The inner surface 216c of the retention strap 216 may abut at least a portion of the peripheral surface 142 of the battery 120 if the battery 120 is moved in a direction that is radially outward from the center of the cradle 202, for example toward the opening 210. In this regard, the retention strap 216 may be configured to at least partially close the opening 210, for example when retention strap 216 is in the relaxed position.

Figure 6A:
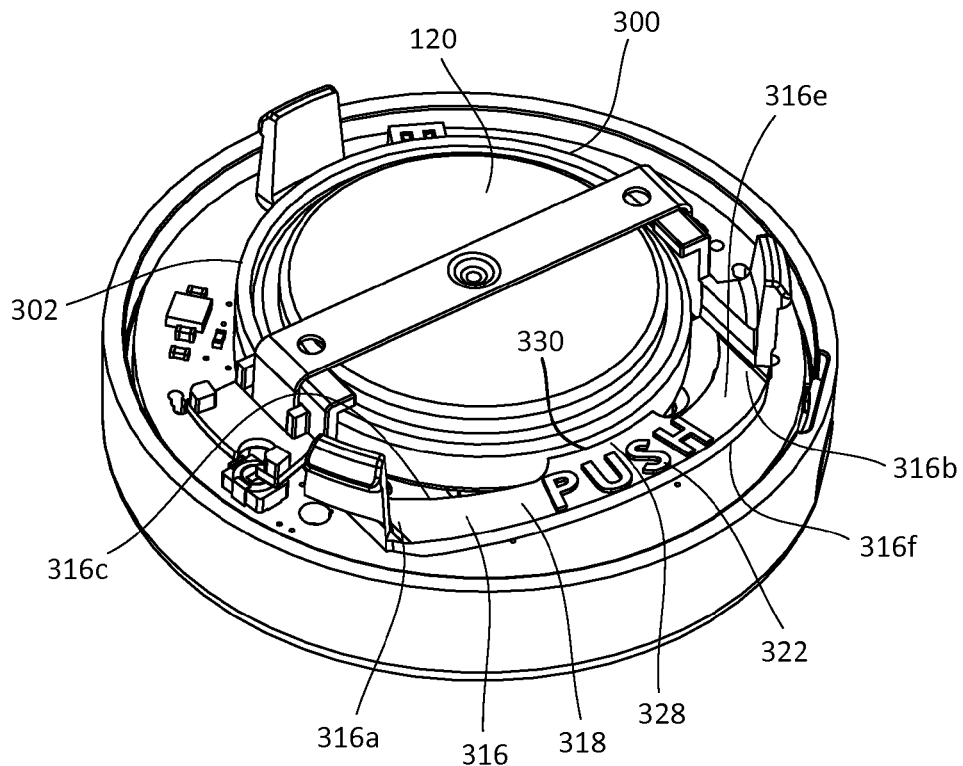
FIG. 6A depicts another example battery holder, having a retention strap configured to abut a portion of a battery.
Figure 6B:
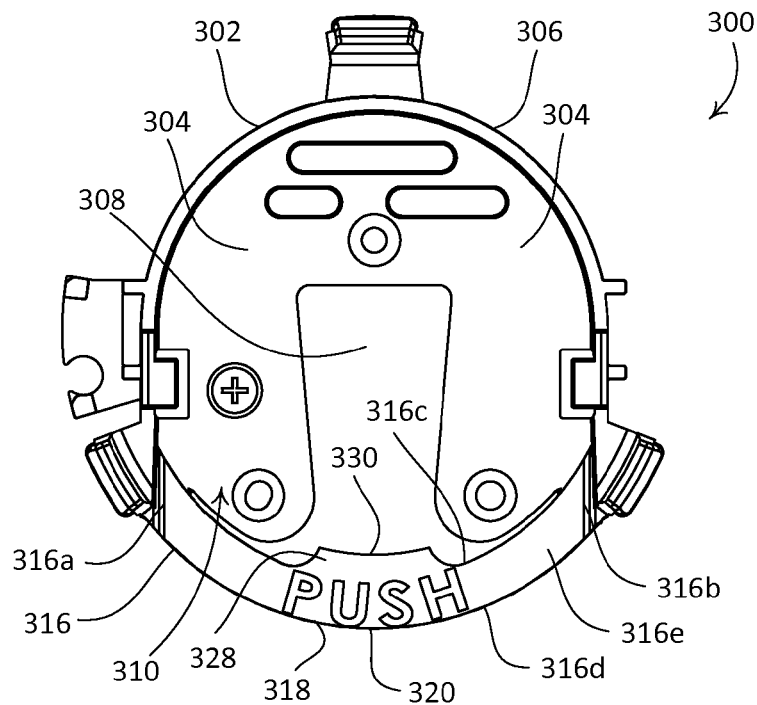
FIG. 6B is a top elevation view of the battery holder illustrated in FIG. 6A.

FIGS. 6A and 6B depict another example battery holder 300, which may be used in a battery-powered sensor, such as the sensor 100 depicted in FIG. 3. The battery holder 300 may be made of any suitable material, for example plastic. The battery holder 300 may include one or more retention members configured to retain a battery (e.g., the battery 120) in the battery holder 300 and/or to restrain motion of the battery 120 when the battery 120 is in an inserted position in the battery holder 300. As shown, the battery holder 300 includes a cradle 302 and a resilient retention strap 316. The cradle 302 and the retention strap 316 may cooperate to retain the battery 120 in the battery holder 300 and to restrain motion of the battery 120 when the battery 120 is in an inserted position in the battery holder 300. The cradle 302 may operate as a first retention member and the retention strap 316 may operate as a second retention member.

The cradle 302 includes a base plate 304 and a wall 306 supported by the base plate 304. The base plate 304 defines a slot 308 that extends there through along a direction that is substantially normal to the base plate 304. The slot 308 may be sized to receive at least a portion of the contact beam 126 of a first electrical contact 122, for example when the battery 120 is inserted in the battery holder 300. The wall 306 may extend (e.g., continuously) along a portion of an outer perimeter of the base plate 304, from a first end 306a to a second end 306b. The cradle 302 defines an opening 310 through which the battery 120 may be inserted into, or removed from, the battery holder 300.

The retention strap 316 may be configured as a resilient, deflectable retention strap 316. The retention strap 316 may be configured to facilitate retention of the battery 120 in an inserted position in the battery holder 300. The retention strap 316 defines a first end 316a and an opposed second end 316b. The retention strap 316 may be elongate between the first and second ends 316a, 316b, respectively. The retention strap 316 may define an inner surface 316c that may face inward relative to the opening 310 and an opposed outer surface 316d that may face outward relative to the opening 310. The retention strap 316 may define an upward facing upper surface 316e and an opposed downward facing lower surface 316f.

The retention strap 316 may be supported by the cradle 302. The retention strap 316 may be integral (e.g., monolithic) with the cradle 302 or may be separate from and attached to the cradle 302 or to another component of the battery holder 300. The first and second ends 316a, 316b of the illustrated retention strap 316 are integral with the base plate 304 at locations proximate to the first and second ends 306a, 306b of the wall 306, such that the retention strap 316 and the cradle 302 are monolithic.

The retention strap 316 may define a curved portion 318 between the first and second ends 316a, 316b. The curved portion 318 may define an apex 320, for example at a location substantially equidistant between the first and second ends 316a, 316b. The curved portion 318 may define a compound curvature. As shown, the curved portion 318 of the retention strap 316 defines a first curvature and a second curvature. The first curvature is defined such that at least one of the inner and outer surfaces 316c, 316d is spaced outwardly, relative to the center of the cradle 302, from the first and second ends 316a, 316b. The inner and outer surfaces 316c, 316d may be spaced furthest from the center of the cradle 302 proximate to the apex 320. The second curvature is defined such that the upper and lower surfaces 316e, 316f of the retention strap 316 are spaced further from the base plate 304 proximate to the apex 320 than at the first and second ends 316a, 316b. The upper and lower surfaces 316e, 316f may be spaced furthest from the base plate 304 proximate to the apex 320.

The retention strap 316 may be configured to be resiliently deflectable between a relaxed position and a deflected position. The retention strap 316 is illustrated in a relaxed position in FIGS. 6A and 6B. The retention strap 316 may be manipulated from the relaxed position to the deflected position by the application of a force to retention strap 316, for example by a force applied to the upper surface 316e of the retention strap 316.

The upper surface 316e of the retention strap 316 may define an indicator 322 including one or more symbols (e.g., letters) pertaining to operation of the retention strap 316. For example, the illustrated retention strap 316 includes an indicator 322 comprising raised letters forming the word "PUSH." It should be appreciated that the retention strap 316 is not limited to the illustrated indicator, and that the retention strap 316 may include any other suitable indicator (e.g., one or more words in a different language, a symbol, or the like) or may not define an indicator, for example such that the upper surface 316e of the retention strap 316 is substantially smooth.

The retention strap 316 may define one or more abutment members configured to abut one or more corresponding portions of the battery 120 when the battery 120 is in an inserted position in the battery holder 300 (e.g., as depicted in FIG. 6A). The retention strap 316 may define an abutment tab 328 configured to abut at least a portion of the battery 120. The abutment tab 328 may extend inward from the inner surface 316c of the retention strap 316, for example along a direction toward the opening 310. The abutment tab 328 may define an abutment surface 330 that may define a curvature, for example a curvature configured to substantially conform to the peripheral surface 142 of the lower body portion 134 of the battery 120. The abutment surface 330 may be spaced inwardly (e.g., toward the center of the cradle 302) from the inner surface 316c of the retention strap 316.

When the battery 120 is in the inserted position in the battery holder 300, at least a first portion of the peripheral surface 142 of the battery 120 may abut a corresponding portion of the wall 306 and at least a second portion of the peripheral surface 142 of the battery 120 may abut a corresponding portion of the abutment surface 330. With at least the first and second portions of the peripheral surface 142 of the battery 120 abutting the corresponding portions of the wall 306 and the abutment surface 330 of the abutment tab 328, movement of the battery within the battery holder 300 may be restrained and the battery 120 may be retained in the battery holder 300. In this regard, the cradle 302 and the retention strap 316 may restrain motion of the battery 120 in all directions in a plane that is substantially coplanar with the bottom surface 144 of the battery 120.

With at least the first and second portions of the peripheral surface 142 of the battery 120 abutting the corresponding portions of the wall 306 and the abutment surface 330 of the abutment tab 328, the battery 120 may not become dislodged from the battery holder 300. For example, the battery 120 may not be ejected from the battery holder 300 if the battery holder 300 absorbs an impact force, such as an impact force imparted to the battery holder 300 when a sensor to which the battery holder 300 is attached (e.g., the sensor 100) falls from at least a threshold height and strikes a surface (e.g., a floor surface). The threshold height may be, for example, a standard ceiling height.

The battery 120 may be inserted and/or removed from the battery holder 300 using processes substantially similar to those described elsewhere herein with reference to the battery holder 200. It should be appreciated that a battery holder configured to retain the battery 120, for example such that the battery 120 may be removed from the battery holder using two distinct motions, is not limited to the battery holders 200 or 300 illustrated and described herein, and that an example battery holder may be alternatively configured to retain the battery 120, for example such that the battery 120 may be removed from the battery holder using two distinct motions.

Figure 7:
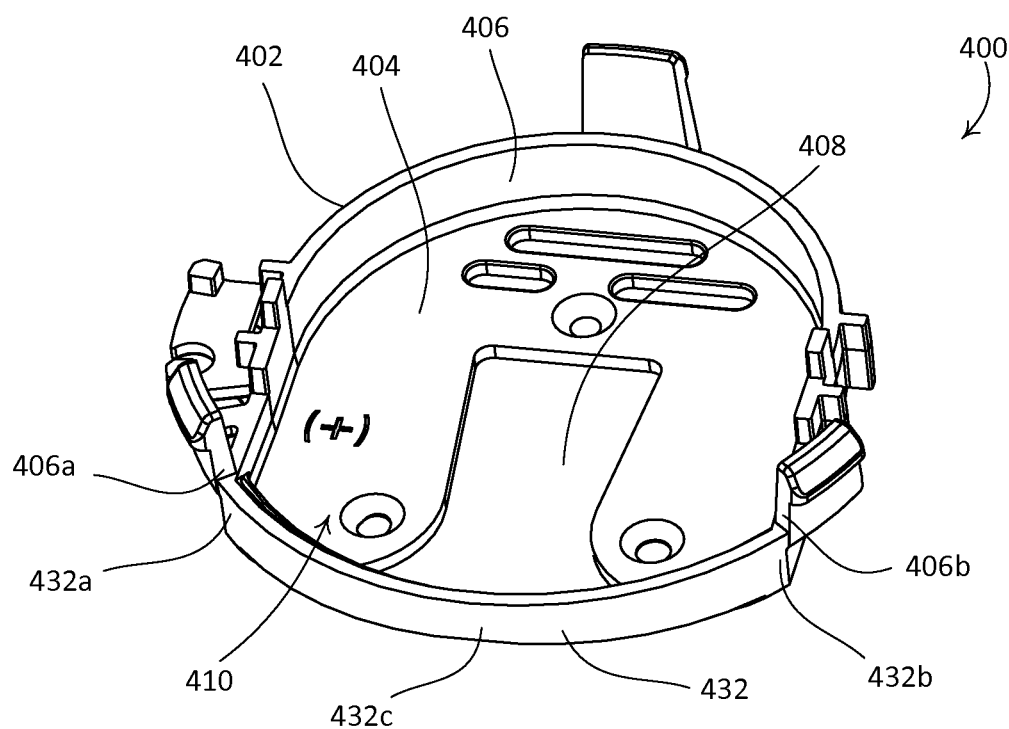
FIG. 7 is a perspective view of another example battery holder, having an annular retention strap.

FIG. 7 depicts another example battery holder 400, which may be used in a battery-powered sensor, such as the sensor 100 depicted in FIG. 3. The battery holder 400 may be made of any suitable material, for example plastic. The battery holder 400 may include one or more retention members configured to retain a battery (e.g., the battery 120) in the battery holder 400. As shown, the battery holder 400 includes a cradle 402 and an annular strap 432 that is configured to retain the battery 120 in the cradle 402. The cradle 402 and the annular strap 432 may cooperate to retain the battery 120 in the battery holder 400. The cradle 402 may operate as a first retention member and the annular strap 432 may operate as a second retention member.

The cradle 402 includes a base plate 404 and a wall 406 supported by the base plate 404. The base plate 404 defines a slot 408 that extends there through along a direction that is substantially normal to the base plate 404. The slot 408 may be sized to receive at least a portion of the contact beam 126 of a first electrical contact 122, for example when the battery 120 is inserted in the battery holder 400. The wall 406 may extend (e.g., continuously) along a portion of an outer perimeter of the base plate 404, from a first end 406a to a second end 406b. The cradle 402 defines an opening 410 through which the battery 120 may be inserted into, or removed from, the battery holder 400.

The annular strap 432 may define a first end 432a and an opposed second end 432b. The annular strap 432 may define one or more areas of curvature between the first and second ends 432a, 432b. As shown, the annular strap 432 is curved along substantially an entirety of its length between the first and second ends 432a, 432b. The annular strap 432 may be integral with (e.g., monolithic with) the cradle 402. As shown, the first end 432a of the annular strap 432 is integral with the first end 406a of the wall 406 and the second end 432b of the annular strap 432 is integral with the second end 406b of the wall 406. The annular strap 432 may be configured to resist deflection (e.g., may be configured to be substantially rigid). For example, at least a portion of the annular strap 432 (e.g., a middle portion 432c located between the first and second ends 432a, 432b) may be configured to be deflected through a short distance (e.g., in a direction downward toward the base plate 404).

The battery 120 may be inserted into the battery holder 400 by inserting the first end 148 of the battery 120 into the opening 410, such that at least a portion of the upper surface 146 of the battery is received below the contact strap 128 (not shown in FIG. 7) and at least a portion of the lower surface 144 (e.g., proximate the first end 148) abuts the contact beam 126 (not shown in FIG. 7), which may cause the contact beam 126 to deflect into the slot 408. As the battery 120 advances into the cradle 402, the lower surface 144 of the battery 120 may ride along the annular strap 432. The battery 120 may advance into an inserted position in the battery holder 400 when second end 150 of the battery 120 advances beyond the annular strap 432, such that at least a portion of the lower surface 144 of the battery 120 abuts the base plate 404 of the cradle 402. With the battery 120 in the inserted position, the annular strap 432 and the wall 406 may surround substantially an entirety of the peripheral surface 142 of the battery 120, so as to retain the battery 120 in the battery holder 400.

The battery 120 may be removed from the battery holder 400 by, for example, applying a force to the annular strap 432 (e.g., applying a downward force to the middle portion 432c) such that at least a portion of the annular strap 432 deflects toward the base plate 404. A force may then be applied to the battery 120 (e.g., applied to the upper surface 146 of the battery 120) along a direction toward the opening 410, such that the lower surface 144 of the battery 120 rides onto the annular strap 432 and the battery 120 slides over the annular strap 432 and out of the battery holder 400. The force may be applied to the annular strap 432 using a finger, for example. The battery 120 may be removed from the battery holder 400 using a prying member (not shown). For example, a prying member may be inserted between the lower surface 144 of the battery 120 and the annular strap 432 (e.g., proximate the middle portion 432c). The prying member may be used to bias the lower surface 144 of the battery 120 upward such that the battery 120 may traverse the annular strap 432 and slide out of the battery holder 400 through the opening 410.

Figure 8:
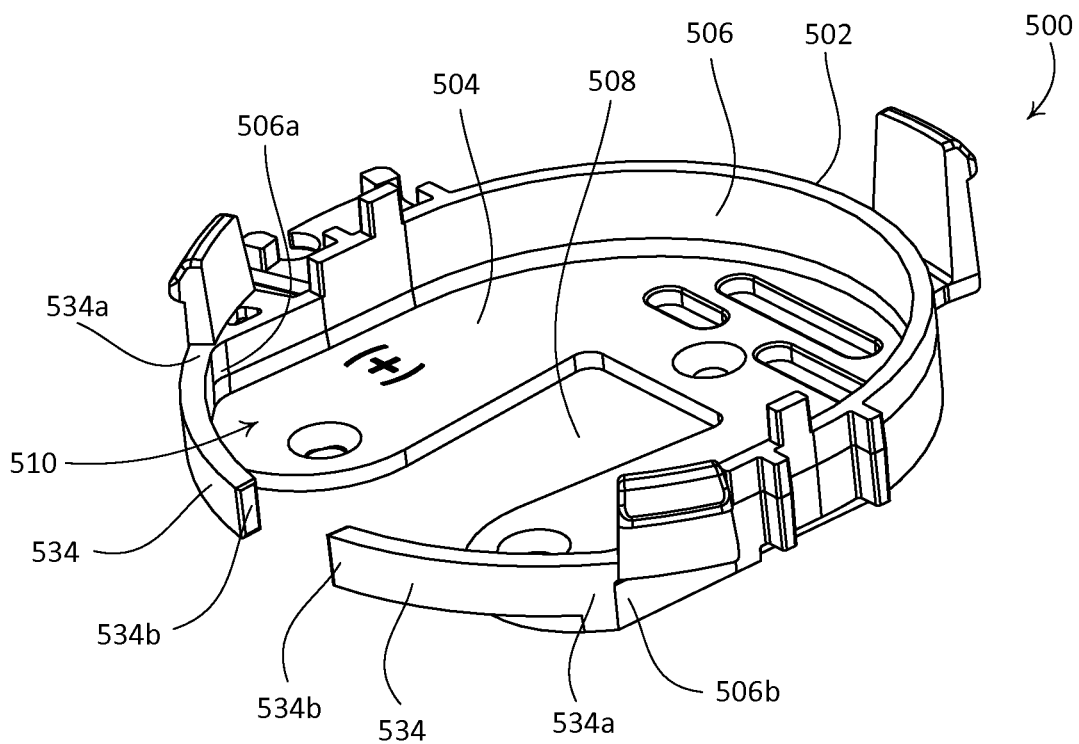
FIG. 8 is a perspective view of another example battery holder, having a pair of resilient curved retention members.

FIG. 8 depicts another example battery holder 500, which may be used in a battery-powered sensor, such as the sensor 100 depicted in FIG. 3. The battery holder 500 may be made of any suitable material, for example plastic. The battery holder 500 may include one or more retention members configured to retain a battery (e.g., the battery 120) in the battery holder 500. As shown, the battery holder 500 includes a cradle 502 and a pair of opposed resilient arms 534 that are configured to retain the battery 120 in the cradle 502. The cradle 502 and the arms 534 may cooperate to retain the battery 120 in the battery holder 500. The cradle 502 may operate as a first retention member and one or both of the arms 534 may operate as second retention members.

The cradle 502 includes a base plate 504 and a wall 506 supported by the base plate 504. The base plate 504 defines a slot 508 that extends there through along a direction that is substantially normal to the base plate 504. The slot 508 may be sized to receive at least a portion of the contact beam 126 of a first electrical contact 122, for example when the battery 120 is inserted in the battery holder 500. The wall 506 may extend (e.g., continuously) along a portion of an outer perimeter of the base plate 504, from a first end 506a to a second end 506b. The cradle 502 defines an opening 510 through which the battery 120 may be inserted into, or removed from, the battery holder 500.

The arms 534 may extend toward each other from the first and second ends 506a, 506b of the wall 506. Each arm 534 may define a fixed end 534a supported by the base plate 504 of the cradle 502 and an opposed free end 534b. Each arm 534 may be configured to be outwardly deformable (e.g., away from the opening 510) about the fixed end 534a. The arms 534 may be curved, for example to conform to the geometry of the peripheral surface 142 of the battery 120.

The battery 120 may be inserted into the battery holder 500 by inserting the first end 148 of the battery 120 into the opening 510, such that at least a portion of the upper surface 146 of the battery is received below the contact strap 128 (not shown in FIG. 8) and at least a portion of the lower surface 144 (e.g., proximate the first end 148) abuts the contact beam 126 (not shown in FIG. 8), which may cause the contact beam 126 to deflect into the slot 508. As the battery 120 advances into the cradle 502, the lower surface 144 of the battery 120 may ride along one or both of the arms 534. The battery 120 may advance into an inserted position in the battery holder 500 when the second end 150 of the battery 120 advances beyond the arms 534, such that at least a portion of the lower surface 144 of the battery 120 abuts the base plate 504 of the cradle 502. With the battery 120 in the inserted position, the arms 534 and the wall 506 may surround a substantial portion of the peripheral surface 142 of the battery 120, so as to retain the battery 120 in the battery holder 500.

The battery 120 may be removed from the battery holder 500 by biasing the second end 150 of the battery 120 toward the opening 510 and into the arms 534, such that the arms 534 deflect outwardly away from the opening 510. With the arms 534 deflected outward, the battery 120 may be advanced at least partially out of the opening 510, for example such that the second end 150 of the battery 120 may be tilted upward away from the base plate 504 and the first end 148 of the battery 120 may be removed from the cradle 502. When the battery 120 is removed from the battery holder 500, the arms 534 may relax to respective non-deflected positions.

Figure 9A:
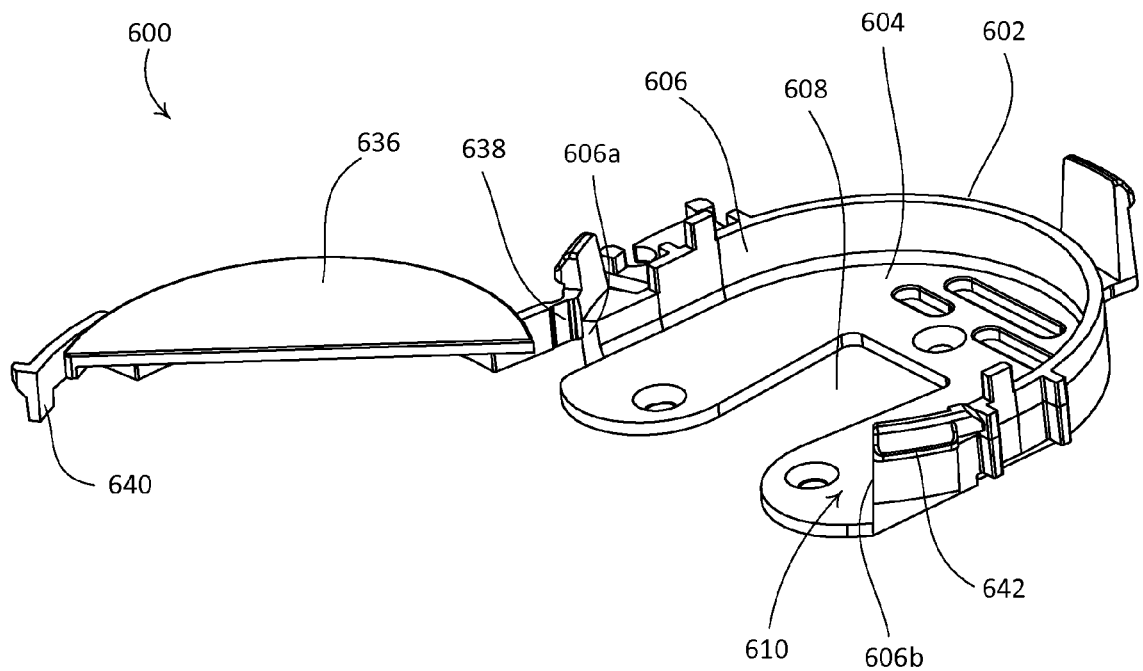
FIG. 9A is a perspective view of another example battery holder, having a resilient, releasably securable battery door, with the battery door open.
Figure 9B:
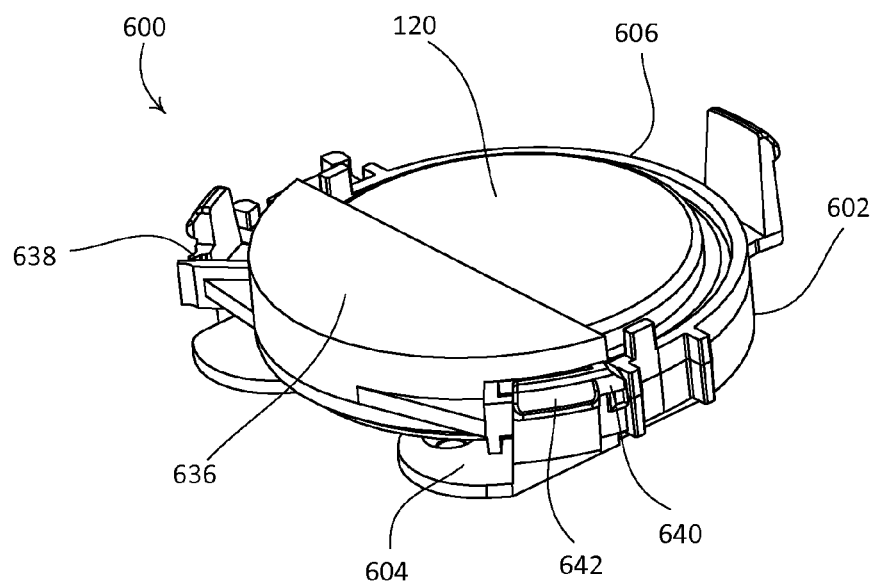
FIG. 9B is a perspective view the battery holder depicted in FIG. 9A, with the battery door closed.

FIGS. 9A and 9B depict another example battery holder 600, which may be used in a battery-powered sensor, such as the sensor 100 depicted in FIG. 3. The battery holder 600 may be made of any suitable material, for example plastic. The battery holder 600 may include one or more retention members configured to retain a battery (e.g., the battery 120) in the battery holder 600. As shown, the battery holder 600 includes a cradle 602 and a battery door 636 that is configured to retain the battery 120 in the cradle 602. The cradle 602 and the battery door 636 may cooperate to retain the battery 120 in the battery holder 600. The cradle 602 may operate as a first retention member and the battery door 636 may operate as a second retention member.

The cradle 602 includes a base plate 604 and a wall 606 supported by the base plate 604. The base plate 604 defines a slot 608 that extends there through along a direction that is substantially normal to the base plate 604. The slot 608 may be sized to receive at least a portion of the contact beam 126 of a first electrical contact 122, for example when the battery 120 is inserted in the battery holder 600. The wall 606 may extend (e.g., continuously) along a portion of an outer perimeter of the base plate 604, from a first end 606a to a second end 606b. The cradle 602 defines an opening 610 through which the battery 120 may be inserted into, or removed from, the battery holder 600.

The battery door 636 may be configured to be operable between an open position (e.g., as illustrated in FIG. 9A) and a closed position (e.g., as illustrated in FIG. 9B). With the battery door 636 in the closed position, the battery door 636 and the cradle 602 may cooperate to retain the battery 120 in the battery holder 600. The battery door 636 may have a first side 636a and an opposed second side 636b. The first side 636a of the battery door 636 may be attached to the cradle 602 (e.g., at a location proximate the first end 606a of the wall 606) by a hinge 638 that may be configured as a living hinge. The second side 636b of the battery door 636 may define a first latch member 640 configured to releasably engage with a second latch member 642 supported by the cradle 602 (e.g., at a location proximate the second end 606b of the wall 606). The battery door 636 may be configured to be pivotable about the hinge 638 between the open and closed positions.

Before the battery 120 is inserted into the battery holder 600, the battery door 636 may be manipulated to the open position. With the battery door 636 in the open position, the battery 120 may be inserted into the battery holder 600 by inserting the first end 148 of the battery 120 into the opening 610, such that at least a portion of the upper surface 146 of the battery is received below the contact strap 128 (not shown in FIGS. 9A and 9B) and at least a portion of the lower surface 144 (e.g., proximate the first end 148) abuts the contact beam 126 (not shown in FIGS. 9A and 9B), which may cause the contact beam 126 to deflect into the slot 608. The battery 120 may advance into an inserted position in the battery holder 600 when second end 150 of the battery 120 advances beyond the opening 610 and at least a portion of the lower surface 144 of the battery 120 abuts the base plate 604 of the cradle 602. With the battery 120 in the inserted position, the battery door 636 may be manipulated to the closed position, such that the battery door 636 and the wall 606 surround substantially an entirety of the peripheral surface 142 of the battery 120, so as to retain the battery 120 in the battery holder 600. With the battery door 636 in the closed position, the first and second latch members 640, 642 may engage with each other, thereby securing the battery door 636 in the closed position. The battery 120 may be removed from the battery holder 600 by performing the above-described process in reverse, for example.

Figure 10:
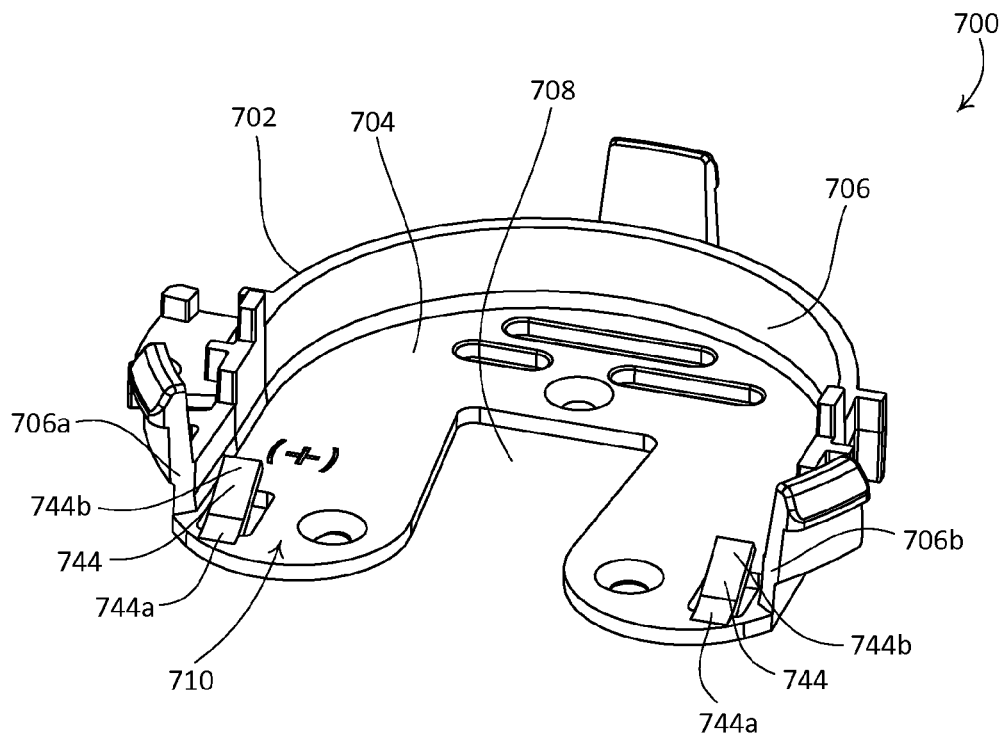
FIG. 10 is a perspective view of another example battery holder, having a cradle that defines a pair of resilient battery retention spring tabs.

FIG. 10 depicts another example battery holder 700, which may be used in a battery-powered sensor, such as the sensor 100 depicted in FIG. 3. The battery holder 700 may be made of any suitable material, for example plastic. The battery holder 700 may include one or more retention members configured to retain a battery (e.g., the battery 120) in the battery holder 700. As shown, the battery holder 700 includes a cradle 702 and a pair of resilient, retention spring tabs 744 that are configured to retain the battery 120 in the cradle 702. The cradle 702 and the retention spring tabs 744 may cooperate to retain the battery 120 in the battery holder 700. The cradle 702 may operate as a first retention member and the retention spring tabs 744 may operate as second retention members.

The cradle 702 includes a base plate 704 and a wall 706 supported by the base plate 704. The base plate 704 defines a slot 708 that extends there through along a direction that is substantially normal to the base plate 704. The slot 708 may be sized to receive at least a portion of the contact beam 126 of a first electrical contact 122, for example when the battery 120 is inserted in the battery holder 700. The wall 706 may extend (e.g., continuously) along a portion of an outer perimeter of the base plate 704, from a first end 706a to a second end 706b. The cradle 702 defines an opening 710 through which the battery 120 may be inserted into, or removed from, the battery holder 700.

The spring tabs 744 may be configured to be deflectable between respective relaxed and deflected positions. The spring tabs 744 may be located on opposed sides of the opening 710 (e.g., proximate the first and second ends 706a, 706b of the wall 706). Each spring tab 744 may define a fixed end 744a supported by the base plate 704 and an opposed free end 744b that is spaced from the upper surface 704b of the base plate 704 when the retention spring tab 744 is in the relaxed position (e.g., as illustrated in FIG. 10). Each spring tab 744 may be manipulated from the relaxed position to a deflected position, for example by applying a force to the free end 744b such that the spring tab 744 deflects about the fixed end 744a. The spring tabs 744 may be substantially coplanar with the base plate 704 when in respective deflected positions.

The battery 120 may be inserted into the battery holder 700 by inserting the first end 148 of the battery 120 into the opening 710, such that at least a portion of the upper surface 146 of the battery is received below the contact strap 128 (not shown in FIG. 10) and at least a portion of the lower surface 144 (e.g., proximate the first end 148) abuts the contact beam 126 (not shown in FIG. 10), which may cause the contact beam 126 to deflect into the slot 708. As the first end 148 of the battery 120 advances through the opening 710, the lower surface 144 of the battery 120 may ride up onto the spring tabs 744 (e.g., substantially concurrently), which may cause the free ends 744b of the spring tabs 744 to deflect toward the base plate 704 and into the deflected positions.

The battery 120 may advance into an inserted position in the battery holder 700 when second end 150 of the battery 120 advances beyond the free ends 744b of the spring tabs 744, such that the spring tabs 744 relax back to the respective relaxed positions. With the spring tabs 744 in the relaxed positions, the free ends 744b of one or both of the spring tabs 744 may cooperate with the wall 706 to retain the battery in the battery holder 700. For example, the peripheral surface 142 of the battery may abut the free ends 744b of one or both of the spring tabs 744 if the battery 120 is moved in a direction that is radially outward from the center of the cradle 702, for example toward the opening 710. The battery 120 may be removed from the battery holder 700 by manipulating the spring tabs 744 to the deflected positions, such that the second end 150 of the battery 120 may ride over the spring tabs 744 as the battery 120 advances out of the opening 710.

Figure 11:
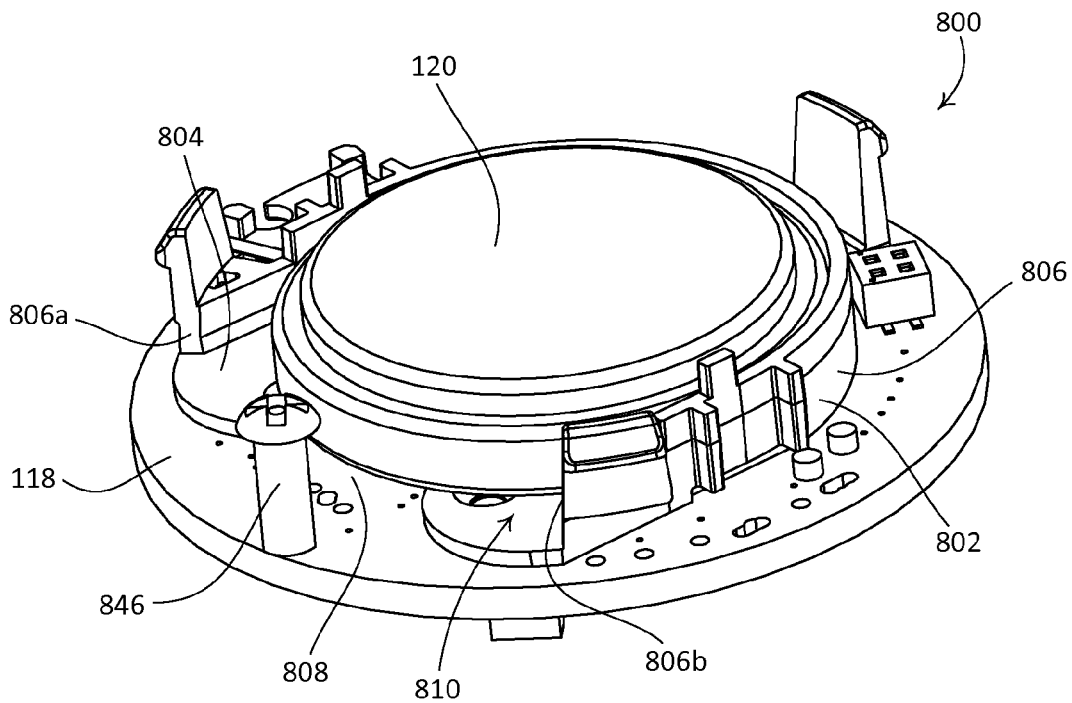
FIG. 11 is a perspective view of another example battery holder, having a removable battery retention member.

FIG. 11 depicts another example battery holder 800, which may be used in a battery-powered sensor, such as the sensor 100 depicted in FIG. 3. The battery holder 800 may be made of any suitable material, for example plastic. The battery holder 800 may include one or more retention members configured to retain a battery (e.g., the battery 120) in the battery holder 800. As shown, the battery holder 800 includes a cradle 802 and a removable battery retention member (e.g., a screw 846) that is configured to retain the battery 120 in the cradle 802. The cradle 802 and the screw 846 may cooperate to retain the battery 120 in the battery holder 800. The cradle 402 may operate as a first retention member and the screw 846 may operate as a second retention member.

The cradle 802 includes a base plate 804 and a wall 806 supported by the base plate 804. The base plate 804 defines a slot 808 that extends there through along a direction that is substantially normal to the base plate 804. The slot 808 may be sized to receive at least a portion of the contact beam 126 of a first electrical contact 122, for example when the battery 120 is inserted in the battery holder 800. The wall 806 may extend (e.g., continuously) along a portion of an outer perimeter of the base plate 804, from a first end 806a to a second end 806b. The cradle 802 defines an opening 810 through which the battery 120 may be inserted into, or removed from, the battery holder 800.

The PCB 118 may be configured to receive the removable battery retention member (e.g., the screw 846). Before the battery 120 is inserted into the battery holder 800, the screw 846 may be operated such that it does not obstruct insertion of the battery 120 into the opening 810. For example, the screw 846 may be advanced (e.g., driven) further into the PCB 118, such that the battery 120 may be inserted into the opening 810 over the head of the screw 846, or the screw 846 may be removed from the PCB 118. With the screw 846 operated so as to not obstruct the opening 810, the battery 120 may be inserted into the battery holder 800 by inserting the first end 148 of the battery 120 into the opening 810, such that at least a portion of the upper surface 146 of the battery is received below the contact strap 128 (not shown in FIG. 11) and at least a portion of the lower surface 144 (e.g., proximate the first end 148) abuts the contact beam 126 (not shown in FIG. 11), which may cause the contact beam 126 to deflect into the slot 808. The battery 120 may advance into an inserted position in the battery holder 800 when second end 150 of the battery 120 advances beyond the opening 810 and at least a portion of the lower surface 144 of the battery 120 abuts the base plate 804 of the cradle 802.

With the battery 120 in the inserted position in the battery holder 800, the screw 846 may be operated into a position such that it obstructs the opening 810, for example by backing the screw 846 out of the PCB 118 a sufficient distance or by returning the screw 846 to the PCB 118 and advancing the screw 846 into position (e.g., if the screw 846 was removed). The screw 846 and the wall 806 may cooperate to retain the battery 120 in the battery holder 800. For example, the peripheral surface 142 of the battery may abut at least a portion of the screw 846 if the battery 120 is moved in a direction that is radially outward from the center of the cradle 802, for example toward the opening 810. The battery 120 may be removed from the battery holder 800, for example, by advancing the screw 846 into the PCB 118 such that the battery 120 may traverse the screw 846 (e.g., the head of the screw 846) and slide out through the opening 810 or by removing the screw 846 from the PCB 118 and sliding the battery 120 out through the opening 810.

The invention claimed is:

1. A battery-powered sensor configured to wirelessly communicate with a load control system, the sensor including a battery holder configured to retain a battery in the sensor, the battery holder comprising:
   a cradle that includes a base plate having an abutment surface that abuts at least a portion of a lower surface of the battery when the battery is in an inserted position in the battery holder, and that further includes a wall that extends upward from the abutment surface along a perimeter of the base plate from a first wall end to a second wall end, the cradle defining an opening through which the battery may be inserted into and removed from the battery holder, the opening at least partially bound by the first and second wall ends and the base plate; and
   a retention strap, the retention strap extending from a first strap end that is fixed proximate to the first wall end to a second strap end that is fixed proximate to the second wall end, the retention strap having a resilient portion between the first and second strap ends that is operable from a relaxed position in which the resilient portion is spaced from the base plate through a first distance, to a deflected position in which the resilient portion is spaced from the base plate through a second distance that is shorter than the first distance,
   wherein the battery holder is monolithic, and
   wherein the cradle and the retention strap cooperate to retain the battery in the battery holder when the retention strap is in the relaxed position.

2. The battery-powered sensor of claim 1, wherein the battery may be removed by sliding the battery through the opening and over the resilient portion when the retention strap is in the deflected position.

3. The battery-powered sensor of claim 1, wherein the base plate defines a substantially circular perimeter.

4. The battery-powered sensor of claim 1, wherein the retention strap is made of a non-conducting material.

5. The battery-powered sensor of claim 1, wherein a section of the resilient portion of the retention strap is curved.

6. The battery-powered sensor of claim 5, wherein the curved section defines an apex that is located substantially equidistant between the first and second strap ends.

7. The battery-powered sensor of claim 6, wherein the curved section extends from the first strap end to the second strap end.

8. The battery-powered sensor of claim 7, wherein the retention strap defines a lower surface that faces the abutment surface of the base plate, and
   wherein the curved section is curved such that the lower surface is concave relative to the abutment surface.

9. The battery-powered sensor of claim 8, wherein the retention strap defines an inner surface that faces inward relative to the opening, and wherein the curved section is curved such that the inner surface is concave relative to the opening.

10. The battery-powered sensor of claim 1, wherein the battery defines an upper surface and a lower surface spaced from the upper surface, and wherein when the battery is inserted in the cradle and the retention strap is in the relaxed position, at least a portion of the retention strap is located between the upper and lower surfaces of the battery.

11. The battery-powered sensor of claim 1, wherein the retention strap defines an abutment tab configured to abut at least a portion of the battery when the battery is in an inserted position in the battery holder.

12. The battery-powered sensor of claim 11, wherein when the battery is in the inserted position, a first portion of the battery abuts the cradle and a second portion of the battery abuts the abutment tab.

13. The battery-powered sensor of claim 11, wherein the battery defines a substantially cylindrical peripheral surface, and wherein the abutment tab defines an abutment surface that is configured to substantially conform to the peripheral surface of the battery.

14. The battery-powered sensor of claim 1, wherein the cradle further includes an alignment member that is configured to properly orient the battery during insertion of the battery into the cradle.

15. A battery holder configured to retain a battery in a battery-powered control device, the battery holder comprising:

a cradle that includes a base plate having an abutment surface that abuts at least a portion of a lower surface of the battery when the battery is in an inserted position in the battery holder, and that further includes a wall that extends upward from the abutment surface along a perimeter of the base plate from a first wall end to a second wall end, the cradle defining an opening through which the battery may be inserted into and removed from the battery holder, the opening at least partially bound by the first and second wall ends and the base plate; and a retention strap, the retention strap extending from a first strap end that is fixed proximate to the first wall end to a second strap end that is fixed proximate to the second wall end, the retention strap having a resilient portion between the first and second strap ends that is operable from a relaxed position in which the resilient portion is spaced from the base plate through a first distance, to a deflected position in which the resilient portion is spaced from the base plate through a second distance that is shorter than the first distance, wherein the battery holder is monolithic, and wherein the cradle and the retention strap cooperate to retain the battery in the battery holder when the retention strap is in the relaxed position.

16. The battery holder of claim 15, wherein the battery may be removed by sliding the battery through the opening and over the resilient portion when the retention strap is in the deflected position.

17. The battery holder of claims 15, wherein the base plate defines a substantially circular perimeter.

18. The battery holder of claim 15, wherein the retention strap is made of a non-conducting material.

19. The battery holder of claim 15, wherein a section of the resilient portion of the retention strap is curved.

20. The battery holder of claim 19, wherein the curved section defines an apex that is located substantially equidistant between the first and second strap ends.

21. The battery holder of claim 19, wherein the curved section extends from the first strap end to the second strap end.

22. The battery holder of claim 21, wherein the retention strap defines a lower surface that faces the abutment surface of the base plate, and wherein the curved section is curved such that the lower surface is concave relative to the abutment surface.

23. The battery holder of claim 22, wherein the retention strap defines an inner surface that faces inward relative to the opening, and wherein the curved section is curved such that the inner surface is concave relative to the opening.

24. The battery holder of claim 15, wherein the battery defines an upper surface and a lower surface spaced from the upper surface, and wherein when the battery is inserted in the cradle and the retention strap is in the relaxed position, at least a portion of the retention strap is located between the upper and lower surfaces of the battery.

25. The battery holder of claim 15, wherein the retention strap defines an abutment tab configured to abut at least a portion of the battery when the battery is in an inserted position in the battery holder.

26. The battery holder of claim 25, wherein when the battery is in the inserted position, a first portion of the battery abuts the cradle and a second portion of the battery abuts the abutment tab.

27. The battery holder of claim 25, wherein the battery defines a substantially cylindrical peripheral surface, and wherein the abutment tab defines an abutment surface that is configured to substantially conform to the peripheral surface of the battery.

28. The battery holder of claim 15, wherein the cradle further includes an alignment member that is configured to properly orient the battery during insertion of the battery into the cradle.

* * * * *